US012654739B2

(12) United States Patent
Tummala et al.

(10) Patent No.: US 12,654,739 B2
(45) Date of Patent: Jun. 16, 2026

(54) TREE BASED BEHAVIOR PREDICTOR

(71) Applicant: QUALCOMM Incorporated, San Diego, CA (US)

(72) Inventors: Gopi Krishna Tummala, San Diego, CA (US); Monu Surana, San Diego, CA (US); Ahmed Kamel Sadek, San Diego, CA (US); Tianqi Ye, San Diego, CA (US); Avdhut Shreenivas Joshi, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 17/352,886

(22) Filed: Jun. 21, 2021

(65) Prior Publication Data

US 2022/0402522 A1 Dec. 22, 2022

(51) Int. Cl.
| | |
|---|---|
| *G06N 20/00* | (2019.01) |
| *B60W 60/00* | (2020.01) |

(Continued)

(52) U.S. Cl.
CPC ......... *B60W 60/0011* (2020.02); *G06F 9/505* (2013.01); *G06F 18/24323* (2023.01);
(Continued)

(58) Field of Classification Search
CPC ......... B60W 60/0011; B60W 2556/20; G06N 20/00; G06N 5/01; G06F 18/24323; G06F 9/505

(Continued)

(56) References Cited

U.S. PATENT DOCUMENTS

| | | | |
|---|---|---|---|
| 10,106,238 B2 | 10/2018 | Sidki et al. | |
| 11,727,269 B2 * | 8/2023 | Xu | G06N 3/09 706/21 |

(Continued)

FOREIGN PATENT DOCUMENTS

| | | | | |
|---|---|---|---|---|
| CN | 108108766 A | * | 6/2018 | G06F 18/253 |
| WO | 2020079074 A2 | | 4/2020 | |

OTHER PUBLICATIONS

Gindele, Learning Driver Behavior Models from Traffic Observations for Decision Making and Planning, Jan. 19, 2015, IEEE Intelligent Transportation Systems Magazine, vol. 7 Issue 1 (Year: 2015).*

*Primary Examiner* — Matthias S Weisfeld
(74) *Attorney, Agent, or Firm* — Polsinelli LLP

(57) ABSTRACT

Various embodiments include methods and devices for training and implementing a tree-based behavior prediction model for use in autonomous vehicle control systems. Some embodiments may include labeling real-world autonomous vehicle run data to indicate an insight of the data, selecting an insight decision tree of the tree-based behavior prediction model for training using the labeled data, training the insight decision tree using the labeled data to classify a probability of an insight associated with the insight decision tree, and updating the tree-based behavior prediction model based on training the insight decision tree. Some embodiments may include selecting an insight decision tree of a tree-based behavior prediction model configured for classifying a probability of an insight associated with the insight decision tree, executing the insight decision tree, and outputting a probability of an insight determined from executing the insight decision tree using the data.

6 Claims, 13 Drawing Sheets

(51) Int. Cl.
    *G06F 9/50*       (2006.01)
    *G06F 18/243*     (2023.01)
    *G06N 5/01*       (2023.01)

(52) U.S. Cl.
    CPC .............. *G06N 5/01* (2023.01); *G06N 20/00*
          (2019.01); *B60W 2556/20* (2020.02)

(58) Field of Classification Search
    USPC ......................................................... 701/23
    See application file for complete search history.

(56)               References Cited

U.S. PATENT DOCUMENTS

| | | | |
|---|---|---|---|
| 2005/0216181 A1* | 9/2005 | Estkowski | ............. G08G 1/166 |
| | | | 340/995.23 |
| 2018/0089563 A1* | 3/2018 | Redding | ............. G05D 1/0088 |
| 2018/0217595 A1 | 8/2018 | Kwon et al. | |
| 2020/0039521 A1* | 2/2020 | Misu | ...................... G06N 20/20 |
| 2020/0070822 A1* | 3/2020 | Yamada | .......... B60W 60/00274 |
| 2020/0125097 A1 | 4/2020 | Juliato et al. | |
| 2020/0391738 A1* | 12/2020 | Isele | ............... B60W 60/00276 |
| 2021/0311778 A1* | 10/2021 | Li | .......................... G06N 3/006 |
| 2021/0370980 A1* | 12/2021 | Ramamoorthy | ..... G08G 1/0116 |

\* cited by examiner

410

Lane Keep Tree:
0:[Dlat< 512] yes=1, no=2, missing=1
1:leaf=1.34455478
2:leaf=0.265982389

Left Lane Change Tree[1]:
0:[Vlat<-512] yes=1, no=2, missing=1
1:leaf=-0.0188203566
2:leaf=-0.706938148

Right Lane Change Tree[2]:
0:[Dlat<512] yes=1, no=2, missing=1
1:leaf=-0.696153462
2:leaf=0.448868513

700

Receive Real-world Autonomous Vehicle Run Data —702

Determine And Select Feature(s) Related To Data —704

Select Insight Decision Tree(s) For Classifying Data —706

Execute Insight Decision Tree(s) For Classifying Data —708

Output Probability Of Insight(s) Of Insight Decision Tree —710

800

800

1

TREE BASED BEHAVIOR PREDICTOR

BACKGROUND

An autonomous vehicular system (AV) tries to accurately predict the future states of the other vehicles to plan for an optimal action. The AV perceives other vehicles using sensors, map data, and the AV system's position. The AV includes systems to predict the future of perceived vehicles on a short horizon. Prediction helps the AV to plan decisions ahead of time, distribute computational resource, and switch between different subsystems. Existing AVs design a rasterized view of the environment surrounding a vehicle and exploiting the advancements in Deep Neural Networks to infer predictions. This approach suffers from: computational overload from the computationally expensive process of view generation and using cascading layers of neural networks; lack of adaptability for different traffic densities, scenarios, and traffic conditions; and lack of explainability due to the decision boundaries on various features for making accurate predictions being hidden by the high dimensionality of neural networks.

SUMMARY

Various disclosed aspects may include apparatuses and methods for training a tree-based behavior prediction model suitable for use in autonomous vehicle processing systems. Aspects may include receiving real-world autonomous vehicle run data, labeling the real-world autonomous vehicle run data at various time slices to indicate to a processing device an insight of the real-world autonomous vehicle run data, selecting an insight decision tree of the tree-based behavior prediction model for training using the labeled real-world autonomous vehicle run data, training the insight decision tree using the labeled real-world autonomous vehicle run data to classify a probability of an insight associated with the insight decision tree, and updating the tree-based behavior prediction model based on training the insight decision tree using the labeled real-world autonomous vehicle run data.

In some aspects, labeling the real-world autonomous vehicle run data at the various time slices may include labeling a first time slice of the various time slices with a ground truth insight, and labeling other time slices of the various time slices preceding the first time slice.

Some aspects may further include determining a feature of the real-world autonomous vehicle run data, and associating the real-world autonomous vehicle run data, the feature of the real-world autonomous vehicle run data, and a label of the real-world autonomous vehicle run data, in which selecting the insight decision tree of the tree-based behavior prediction model for training may include selecting the insight decision tree configured for classifying the probability of the insight of the label based on the feature.

In some aspects, training the insight decision tree may include: determining whether a confidence score associated with a node of the insight decision tree exceeds a confidence threshold, and removing the node in response to determining that the confidence score associated with the node does not exceed the confidence threshold.

Some aspects may further include determining whether a number of nodes of the insight decision tree exceeds an amount threshold, in which determining whether the confidence score associated with the node of the insight decision tree exceeds the confidence threshold may occur in response to determining that the number of nodes of the insight decision tree exceeds the amount threshold.

Various disclosed aspects may include apparatuses and methods for implementing a tree-based behavior prediction model. Aspects may include receiving real-world autonomous vehicle run data, selecting an insight decision tree of the tree-based behavior prediction model configured for classifying a probability of an insight associated with the insight decision tree using the real-world autonomous vehicle data, executing the insight decision tree using the real-world world autonomous vehicle data, and outputting the probability of the insight associated with the insight decision tree based on executing the insight decision tree using the real-world autonomous vehicle data.

In some aspects, selecting the insight decision tree of the tree-based behavior prediction model configured for classifying the probability of the insight associated with the insight decision tree using the real-world autonomous vehicle data may include: determining a feature of the real-world autonomous vehicle data, and selecting the insight decision tree based on the insight decision tree being configured for classifying the probability of the insight associated with the insight decision tree using the feature.

In some aspects, selecting the insight decision tree of the tree-based behavior prediction model configured for classifying the probability of the insight associated with the insight decision tree using the real-world autonomous vehicle data may include determining whether a computational load of a processing device of an autonomous vehicle exceeds a computational load threshold, and selecting the insight decision tree based on the insight decision tree requiring fewer computations to traverse than a computation threshold in response to determining that the computational load of the processing device of the autonomous vehicle exceeds the computational load threshold.

In some aspects, selecting the insight decision tree based on the insight decision tree requiring fewer computations to traverse than a computation threshold may include selecting the insight decision tree based on one of a depth of the insight decision tree not exceeding a depth indicated by the computation threshold or a number of feature threshold computations for nodes of an insight decision tree not exceeding a number of feature threshold computations indicated by the computation threshold.

Some aspects may further include determining a feature of the real-world autonomous vehicle data, in which selecting the insight decision tree of the tree-based behavior prediction model configured for classifying the probability of the insight associated with the insight decision tree using the real-world autonomous vehicle data may include determining whether a characteristic of the feature indicates to a processing device a variable nature of environmental conditions surrounding an autonomous vehicle, and selecting the insight decision tree based on an adaptability of the insight decision tree in response to the characteristic of the feature indicating to the processing device a variable nature of environmental conditions surrounding the autonomous vehicle.

In some aspects, determining whether a characteristic of the feature indicates to the processing device a variable nature of environmental conditions surrounding the autonomous vehicle may include one of determining a confidence scores of the feature does not exceed a feature confidence threshold configured to indicate to a processing device a confidence in identification of the feature or determining multiple different classifications of a feature type for the feature.

In some aspects, selecting the insight decision tree based on an adaptability of the insight decision tree may include selecting the insight decision tree based on the insight decision tree being configured for classifying the probability of the insight associated with the insight decision tree using multiple features.

In some aspects, selecting the insight decision tree of the tree-based behavior prediction model configured for classifying the probability of the insight associated with the insight decision tree using the real-world autonomous vehicle data may include selecting the insight decision tree corresponding with a level of explainability set by a user.

In some aspects, selecting the insight decision tree of the tree-based behavior prediction model configured for classifying a probability of the insight associated with the insight decision tree using the real-world autonomous vehicle data may include determining a plurality insight decision trees, of which the insight decision tree is one, of the tree-based behavior prediction model configured for classifying probabilities of the insight associated with the plurality of insight decision trees using the real-world autonomous vehicle data, executing the insight decision tree using the real-world autonomous vehicle data may include executing the plurality of insight decision trees using the real-world autonomous vehicle data, and outputting the probability of the insight associated with the insight decision tree based on executing the insight decision tree using the real-world autonomous vehicle data may include outputting a plurality of probabilities of the insight associated with the plurality of insight decision trees based on executing the plurality of insight decision trees using the real-world autonomous vehicle data.

Some aspects may further include outputting a confidence score associated with the probability of the insight associated with the insight decision tree based on executing the insight decision tree using the real-world autonomous vehicle data.

Further aspects include a computing device having a processing device configured with executable instructions to perform operations of any of the methods summarized above. Further aspects include a computing device having means for performing functions of any of the methods summarized above. Further aspects include a non-transitory processor-readable medium having stored thereon processor-executable instructions configured to cause a processor and other components of a computing device to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
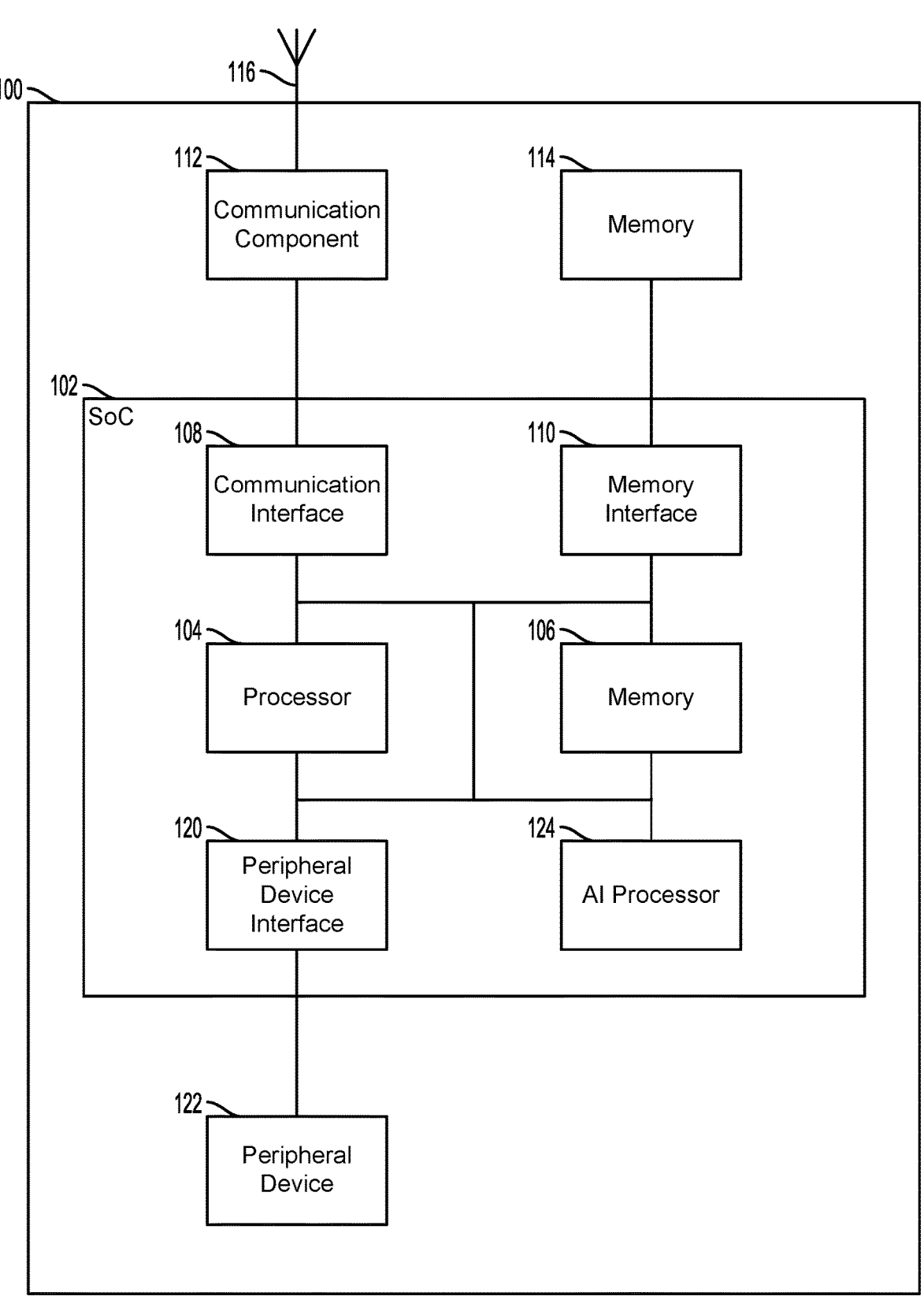
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments may include methods, and computing devices implementing such methods for decision tree-based behavior predictions for predicting actions of other vehicles in the environment surrounding a vehicle. The various embodiments may be implemented in a safety critical system (e.g., vehicular systems, such as automotive, avionic, marine etc.).

The term "computing device" may refer to stationary computing devices including personal computers, desktop computers, all-in-one computers, workstations, super computers, mainframe computers, embedded computers (such as in vehicles and other larger systems), computerized vehicles (e.g., partially or fully autonomous terrestrial, aerial, and/or aquatic vehicles, such as passenger vehicles, commercial vehicles, recreational vehicles, military vehicles, drones, etc.), servers, multimedia computers, and game consoles. The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor.

The terms "predictor" and "prediction model" are used herein interchangeably in the context of a tree-based behavior predictor or a tree-based behavior prediction model.

The autonomous vehicular system (AV) short horizon prediction problem may be viewed as a regression problem, estimating the positions of neighboring vehicles and their states and interactions for next few seconds, or a classification problem, estimating their high-level behavioral intentions, for example, plotting a likely future path of a vehicle in a space. Considering the safety critical nature of autonomous driving, an earlier prediction with a low computational overhead may help in reducing jerks (enhancing the quality of driving), prevent catastrophic incidents, and select optimal driving decisions.

Various embodiments provide a computationally lightweight, adaptable, and explainable decision tree-based behavior prediction system. This system may predict high level insights about neighboring vehicles. High-level insights may include, for example: lane change predictions such as left lane change or a right lane change; future motion state of the vehicles such as acceleration or deceleration; map state of the vehicle such as exiting via exit ramp or entering the highway from the ramp; and complex maneuvers such as accelerated lane change or decelerated lane change.

The decision tree-based behavior prediction system uses features that may allow for easy to explain decisions, identification of events that the system has not yet learned, and incorporation of human intelligence over learned decisions. The features may include, for example: dynamic based features of a distance-from-boundary, a distance from a lane center (Dlat), a differential of Dlat (Vlat), acceleration, speed, etc.; road information of a road curvature, a heading, a road-type, a type of traffic (e.g., surface street traffic, highway traffic, etc.), traffic conditions (stop-and-go, urban, highway, etc.), a speed-limit, rich semantic map information, like lane location, lane type (e.g., merging lane, no-passing lane, etc.), road markings, etc.; perception-based features of a blinker status, a vehicle classification type (e.g., car, truck, motorcycle, etc.), yaw, angular velocity, insights about the vehicle (aggressive driver based on observations, etc.), etc.; interaction features of a neighboring vehicle, such as whether a neighboring vehicle is a leader or follower in the adjacent lanes, relative distances between vehicles, relative positions of the vehicles, speeds of the vehicles, average-speeds in particular lanes, etc.; and/or temporal features of a history of the aforementioned features.

The decision tree-based behavior prediction system is data driven. Data accumulated during real-world autonomous vehicle runs may be synthesized by postprocessing the real-world autonomous vehicle runs. A ground truth may be derived based on whether a neighboring vehicle performed a particular maneuver. Data preceding the ground truth event may be labeled in relation to the ground truth event. Labeled data may be associated with the feature-sets, set boundaries for the features, and with driving intentions. Decision tree-based behavior prediction models may be expanded and/or contracted during a training phase. Each prediction model may be a forest containing a collection of decision trees. A prediction model may be constructed by learning sets of rules and subrules on the features. These rules may be represented in a tree format. For example, whether data values exceeding a feature boundary may determine down which path of the tree to proceed. During the training phases, trees that improve the prediction performance on the training data may be added to the prediction model. Additionally, a tree may be expanded by splitting a leaf (adding a subrule) in such a way that the prediction accuracy is improved. During the training phase, the system may learn which features to analyze for a prediction and what boundaries to use on individual features to determine the prediction. Trees for which the prediction accuracy is low, such as lower than other trees for the same or similar features and/or a prediction confidence threshold, and/or excessive trees, such as a number of trees of a prediction model exceeding a tree amount threshold, may be removed from the prediction model.

The decision tree-based behavior prediction system may limit its complexity, which may be configured during training. Essentially, the training process may limit the number of rules and subrules and fine tune its thresholds with new additions of data. Different prediction models may be generated to support complexity, situational, and explainability needs. For example, shallow trees may be simpler and more intuitive and suffice in terms of complexity requirements for certain scenarios as compared to deeper trees. The decision tree-based behavior prediction system may select an appropriate prediction model during runtime based on various factors, including, for example: type of scenario, such as different models may be tailored for traffic scenarios and/or vehicle class (e.g., car, truck, motorcycle, etc.); complexity needs, such as if there is a computational bottleneck, shallow and computationally light weight prediction models may be favored; and/or explainability needs, such as models where each tree decision is highly confident may favored for very quick and intuitive reasoning for a certain decision compared to tree having lower confidence scores for decisions and may require more decisions to be made to achieve an confidence level in a prediction.

FIG. 1 illustrates a system including a computing device 100 suitable for use with various embodiments. The computing device 100 may include an SoC 102 with a processor 104, a memory 106, a communication interface 108, a memory interface 110, and a peripheral device interface 120. The computing device 100 may further include a communication component 112, such as a wired or wireless modem, a memory 114, an antenna 116 for establishing a wireless communication link, and/or a peripheral device 122. The processor 104 may include any of a variety of processing devices, for example a number of processor cores.

The term "system-on-chip" or "SoC" is used herein to refer to a set of interconnected electronic circuits typically, but not exclusively, including a processing device, a memory, and a communication interface. A processing device may include a variety of different types of processors 104 and/or processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and/or a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and/or time references. Integrated circuits may be configured such that the components of the integrated circuit reside on a single piece of semiconductor material, such as silicon.

An SoC 102 may include one or more processors 104. The computing device 100 may include more than one SoC 102, thereby increasing the number of processors 104 and processor cores. The computing device 100 may also include processors 104 that are not associated with an SoC 102.

Individual processors 104 may be multicore processors. The processors 104 may each be configured for specific purposes that may be the same as or different from other processors 104 of the computing device 100. One or more of the processors 104 and processor cores of the same or different configurations may be grouped together. A group of processors 104 or processor cores may be referred to as a multiprocessor cluster.

The memory 106 of the SoC 102 may be a volatile or non-volatile memory configured for storing data and processor-executable code for access by the processor 104 or by other components of SoC 102, including an artificial intelligence (AI) processor 124. The computing device 100 and/or SoC 102 may include one or more memories 106 configured for various purposes. One or more memories 106 may include volatile memories such as random access memory (RAM) or main memory, or cache memory. These memories 106 may be configured to temporarily hold a limited amount of data received from a data sensor or subsystem, data and/or processor-executable code instructions that are requested from non-volatile memory, loaded to the memories 106 from non-volatile memory in anticipation of future access based on a variety of factors, and/or intermediary processing data and/or processor-executable code instructions produced by the processor 104 and/or AI processor 124 and temporarily stored for future quick access without being stored in non-volatile memory. In some embodiments, any number and combination of memories 106 may include one-time programmable or read-only memory.

The memory 106 may be configured to store data and processor-executable code, at least temporarily, that is loaded to the memory 106 from another memory device, such as another memory 106 or memory 114, for access by one or more of the processors 104 or by other components of SoC 102, including the AI processor 124. The data or processor-executable code loaded to the memory 106 may be loaded in response to execution of a function by the processor 104 or by other components of SoC 102, including the AI processor 124. Loading the data or processor-executable code to the memory 106 in response to execution of a function may result from a memory access request to the memory 106 that is unsuccessful, or a "miss," because the requested data or processor-executable code is not located in the memory 106. In response to a miss, a memory access request to another memory 106 or memory 114 may be made to load the requested data or processor-executable code from the other memory 106 or memory 114 to the memory 106. Loading the data or processor-executable code to the memory 106 in response to execution of a function may result from a memory access request to another memory 106 or memory 114, and the data or processor-executable code may be loaded to the memory 106 for later access.

The memory interface 110 and the memory 114 may work in unison to allow the computing device 100 to store data and processor-executable code on a volatile and/or non-volatile storage medium, and retrieve data and processor-executable code from the volatile and/or non-volatile storage medium. The memory 114 may be configured much like an embodiment of the memory 106 in which the memory 114 may store the data or processor-executable code for access by one or more of the processors 104 or by other components of SoC 102, including the AI processor 124. In some embodiments, the memory 114, being non-volatile, may retain the information after the power of the computing device 100 has been shut off. When the power is turned back on and the computing device 100 reboots, the information stored on the memory 114 may be available to the computing device 100. In some embodiments, the memory 114, being volatile, may not retain the information after the power of the computing device 100 has been shut off. The memory interface 110 may control access to the memory 114 and allow the processor 104 or other components of the SoC 12, including the AI processor 124, to read data from and write data to the memory 114.

An SoC 102 may also include an AI processor 124. The AI processor 124 may be a processor 104, a portion of a processor 104, and/or a standalone component of the SoC 102. The AI processor 124 may be configured to execute neural networks for processing activation values and weight values on the computing device 100. The computing device 100 may also include AI processors 124 that are not associated with the SoC 102. Such AI processors 124 may be standalone components of the computing device 100 and/or integrated into other SoCs 102.

The computing device 100 may include any number and combination of peripheral devices 122, such as: a surroundings sensing device, like a camera, a RADAR, a LiDAR, a microphone, etc.; a position sensing device, like a GPS, etc.; a motion sensing device, like a speedometer, an accelerometer, etc.; and/or a pose sensing device like a compass, an accelerometer, a gyroscope, etc. Any number and combination of peripheral device interfaces 120 may be integral to the SoC 102, and may be configured to facilitate data transmission between the peripheral devices 122 and components of the SoC 102, such as the processors 104, the memory 106, the AI processor 124, etc.

Some or all of the components of the computing device 100 and/or the SoC 102 may be arranged differently and/or combined while still serving the functions of the various embodiments. The computing device 100 may not be limited to one of each of the components, and multiple instances of each component may be included in various configurations of the computing device 100.

Figure 2:
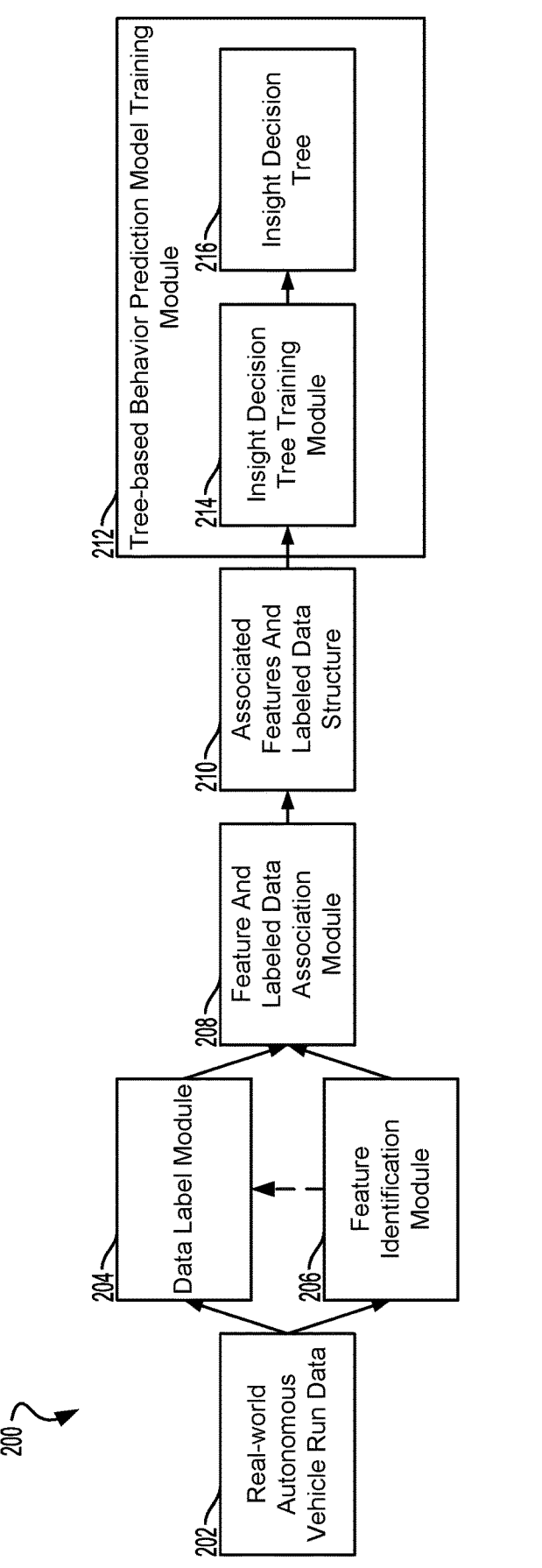
FIG. 2 is a component block and flow diagram illustrating an example tree-based behavior prediction system for training a tree-based behavior predictor suitable for implementing various embodiments.

FIG. 2 illustrates an example tree-based behavior prediction system 200 for training a tree-based behavior predictor suitable for implementing various embodiments. The tree-based behavior prediction system 200 may include various modules, which may be implemented in software and/or hardware. With reference to FIGS. 1 and 2, a processor 104, including an AI processor 124, may be configured to implement the tree-based behavior prediction system 200 for training the tree-based behavior predictor. In some embodiments, the processor 104 may be a single processor, such as single or multicore processors, multiple distributed processors, such as processors on separate semiconductor dice), and/or remote processors, such as server processors on a cloud computing network. In some embodiments, a vehicle (not shown) may communicate with the processor 104 via V2X technology.

The tree-based behavior prediction system 200 may receive real-world autonomous vehicle run data 202, which may be accumulated during testing or live operation of a vehicle equipped with any number and combination of peripheral devices (e.g., peripheral devices 122 in FIG. 1) configured to capture the real-world autonomous vehicle run data 202. The real-world autonomous vehicle run data 202 may be collected during human controlled driving runs, semi-autonomous driving runs, and/or autonomous driving runs. In some embodiments, the tree-based behavior prediction system 200 may be integral to the vehicle and the tree-based behavior prediction system 200 may access the real-world autonomous vehicle run data 202 from a memory (e.g., memory 106, 114 in FIG. 1) of the vehicle. In some embodiments, the tree-based behavior prediction system 200 may be separate from the vehicle and the tree-based behavior prediction system 200 may receive the real-world autonomous vehicle run data 202 via a wired or wireless communication system (e.g., communication interface 108, communication component 112, antenna 116 in FIG. 1) of a computing device (e.g., computing device 100 in FIG. 1) implementing the tree-based behavior prediction system 200. The real-world autonomous vehicle run data 202 may include sensor data captured by any number and combination of sensors (not shown) of the peripheral devices.

A data label module 204 of the tree-based behavior prediction system 200 may receive the real-world autonomous vehicle run data 202 as an input. The data label module 204 may be configured to apply labels of various insights to the real-world autonomous vehicle run data 202. For example, the labels may be applied to the real-world autonomous vehicle run data 202 at different time slices for the data 202 over a length of time that the data 202 spans. The length of time may be a length of time preceding a ground truth insight, known to be a true insight relating to the real-world autonomous vehicle run data 202. For another example, a user of the tree-based behavior prediction system 200 may designate the time slices at which to label the real-world autonomous vehicle run data 202, and the data label module 204 may label the real-world autonomous vehicle run data 202 at the time slices designated by the user.

In some embodiments, the data label module 204 may determine the ground truth insight and label the real-world autonomous vehicle run data 202 at a time slice of an occurrence of the ground truth insight. In some embodiments, the user of the tree-based behavior prediction system 200 may input a ground truth insight for a time slice of an occurrence of the ground truth insight, and the data label module 204 may label the real-world autonomous vehicle run data 202 at the time slice of the occurrence of the ground truth insight. The label for the real-world autonomous vehicle run data 202 at the time slice of the occurrence of the ground truth insight may be configured to indicate the type of insight of the ground truth insight.

The data label module 204 may label the real-world autonomous vehicle run data 202 at multiple at time slices preceding the time slice for which the data 202 is labeled with the ground truth insight. For example, the data label module 204 may label the real-world autonomous vehicle run data 202 at multiple at time slices for a number of seconds, such as approximately 2 seconds, preceding the time slice for which the data 202 is labeled with the ground truth insight. In some embodiments, the labels may be selected by the data label module 204 based on an insight associated with a highest probability and/or confidence of the real-world autonomous vehicle run data 202 at a time slice as determined by an insight decision tree. The insight decision tree applied to the real-world autonomous vehicle run data 202 at the time slice may be selected by the data label module 204. For example, the data label module 204 may select and apply an insight decision tree for determining probabilities of the type of insight of the ground truth insight. For another example, the data label module 204 may select and apply multiple insight decision trees and select labels based on the type of insight of an insight decision tree resulting in a highest probability and/or confidence score for the real-world autonomous vehicle run data 202 at the time slice. For another example, the data label module 204 may select and apply multiple insight decision trees based on features of the real-world autonomous vehicle run data 202 that the insight decision trees are configured to process. The multiple insight decision trees may be insight decision trees for determining probabilities of types of insights that typically precede the ground truth insight. The multiple insight decision trees may be insight decision trees for determining probabilities of types of insights specified by a user of the tree-based behavior prediction system 200. In some embodiments, the data label module 204 may be configured to apply labels of various insights to the real-world autonomous vehicle run data 202 in response to labels at time slices input by the user of the tree-based behavior prediction system 200.

A feature identification module 206 of the tree-based behavior prediction system 200 may receive the real-world autonomous vehicle run data 202 as an input. The feature identification module 206 may be configured to analyze the labeled real-world autonomous vehicle run data 202 and determine features of the data 202. For example, the feature identification module 206 may analyze video data to determine visual features, such as neighboring vehicle blinker, neighboring vehicle type, neighboring vehicle position in a lane, lane locations, street markings, street signs, traffic density, obstacles, etc. For another example, the feature identification module 206 may analyze radar or LiDAR data to determine spatial features, such as neighboring vehicle distance from cardinal vehicle, relative forward velocity and/or lateral velocity of neighboring vehicle, traffic density, obstacles, etc. For another example, the feature identification module 206 may analyze global navigation satellite system (GNSS) data (e.g., Global Positioning System (GPS) data) to determine vehicle pose related features, such as direction of travel, forward velocity, location, etc. For another example, the feature identification module 206 may analyze rich semantic map information, such as street configurations, traffic patterns, speed limits, etc. The feature identification module 206 may determine features of any number and combination of the real-world autonomous vehicle run data 202 at a time slice and/or a range of time slices of the data 202. In some embodiments, the feature identification module 206 may use a machine learning model, such as a classification model, to determine the features from the real-world autonomous vehicle run data 202. The feature identification module 206 may associate features with the real-world autonomous vehicle run data 202 and output the associations. In some embodiments, the features of the real-world autonomous vehicle run data 202 determined by the feature identification module 206 may be provided to the data label module 204.

A feature and labeled data association module 208 of the tree-based behavior prediction system 200 may receive the association of the features with the real-world autonomous vehicle run data 202 from the feature identification module 206 and the labeled data from the data label module 204. The feature and labeled data association module 208 may generate an associated features and labeled data structure 210, which may be a data structure, such as a database, list, array, etc., associating the real-world autonomous vehicle run data 202, the features of the data 202, the labels of the data 202. In some embodiments, the feature and labeled data association module 208 may associate individual time slices of the real-world autonomous vehicle run data 202 with the features and the labels of the data 202. In some embodiments, the feature and labeled data association module 208 may associate a range of multiple time slices of the real-world autonomous vehicle run data 202 with the features and the labels of the data 202 for data 202 having the same features and labels.

A tree-based behavior prediction model training module 212 of the tree-based behavior prediction system 200 may be configured to train a tree-based behavior prediction model using the information of the associated features and labeled data structure 210. A tree-based behavior prediction model may include any number and combination of insight decision trees. For example, a tree-based behavior prediction model may include insight decision trees configured for a single insight. For another example, a tree-based behavior prediction model may include insight decision trees configured for multiple related insights, for example, alternative insights, such as a direction turn insight and a forward direction insight, or complementary insights, such as a directional turn insight and a speed change insight. For another example, a tree-based behavior prediction model may include insight decision trees configured for multiple insights related to a feature, for example, insights typically used for a traffic type or pattern. Each tree-based behavior prediction model may be a forest containing a collection of insight decision trees. A tree-based behavior prediction model may be constructed by learning sets of rules and subrules on features. These rules may be represented in a tree format. For example, whether data values exceeding a feature boundary may determine down which path of the tree to proceed. The tree-based behavior prediction model may be generated, updated, stored in memory (e.g., memory 106, 114 in FIG. 1), and executed by the processor from a text file, a program code or code object, an encrypted text file, etc.

The tree-based behavior prediction model training module 212 may select any number and combination of tree-based behavior prediction models and/or insight decision trees of the tree-based behavior prediction models for training using the information of the associated features and labeled data structure 210. For example, the tree-based behavior prediction model training module 212 may select tree-based behavior prediction models and/or insight decision trees based on whether the insights of the tree-based behavior prediction models and/or insight decision trees correspond with a label of the associated features and labeled data structure 210. For another example, the tree-based behavior prediction model training module 212 may select tree-based behavior prediction models and/or insight decision trees based on whether the features of the tree-based behavior prediction models and/or insight decision trees correspond with a feature of the associated features and labeled data structure 210.

An insight decision tree training module 214 of the tree-based behavior prediction system 200 may be configured to train the insight decision trees of the tree-based behavior prediction models selected by the tree-based behavior prediction model training module 212. The insight decision tree training module 214 may use the information of the associated features and labeled data structure 210 to train the insight decision trees. For example, the real-world autonomous vehicle run data 202 labeled with an insight may be used to train insight decision trees configured for determining a probability of the same and/or related insight. For another example, the real-world autonomous vehicle run data 202 associated with any number and combination of features may be used to train insight decision trees configured for determining a probability of an insight using at least one of the features associated with the data 202. The insight decision tree training module 214 may use various means for training the insight decision trees, such as gradient boosting.

Training the insight decision trees may include modifying existing insight decision trees and/or generating new insight decision trees. In some embodiments, modifying existing insight decision trees may include modifying nodes of the of the insight decision trees, such as by updating feature thresholds for nodes, adding nodes, deleting nodes, including entire insight decision trees, and/or updating confidence scores of the nodes, and/or updating confidence scores of the insight decision trees. Training the insight decision trees by deleting nodes may include determining whether to remove a node and/or an insight decision tree based on a confidence threshold, for which a node and/or an insight decision tree associated with a confidence score not exceeding the confidence threshold may be deleted. Training the insight decision trees by deleting nodes may include determining whether to remove a node and/or an insight decision tree based on an amount threshold, for which a number of nodes in an insight decision tree and/or a number of insight decision trees exceeds the amount threshold, a node and/or an insight decision tree associated with a confidence score not exceeding the confidence threshold may be removed. In some embodiments, generating new insight decision trees may include adding nodes, defining feature thresholds for the nodes, assigning confidence scores to the nodes, and/or assigning confidence scores to the insight decision trees. The insight decision tree training module 214 may output updated and/or newly generated insight decision trees 216. For example, the prediction model may be stored in memory and executed by a processor from a text file, a program code or code object, an encrypted text file, etc.

Figure 3:
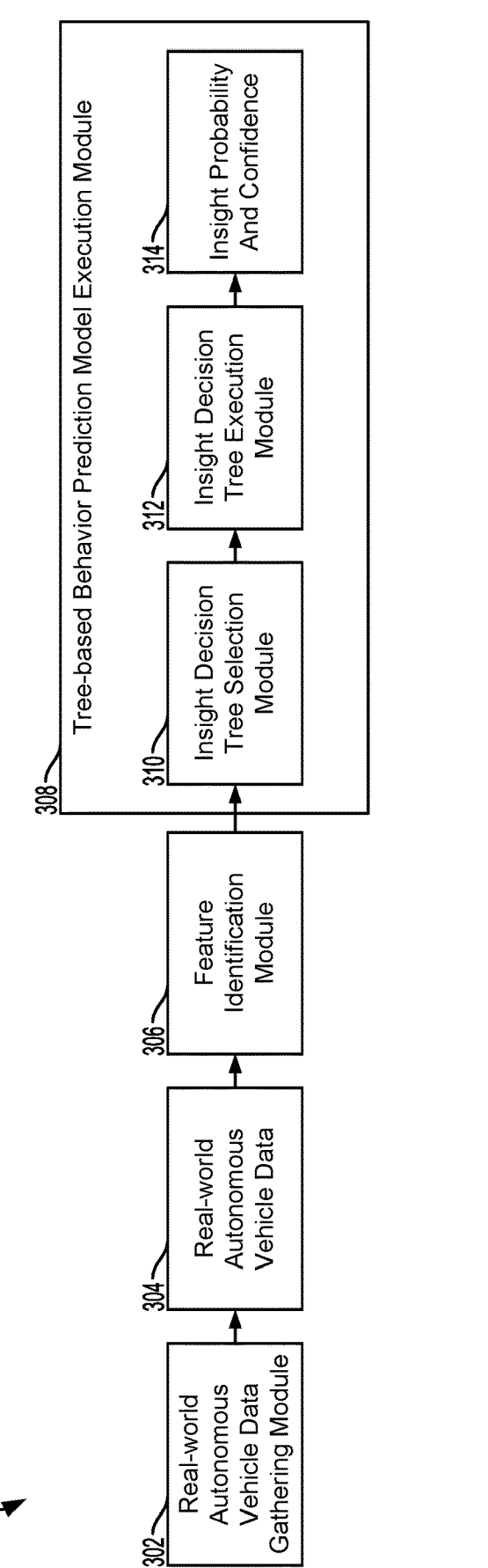
FIG. 3 is a component block and flow diagram illustrating an example tree-based behavior prediction system for implementing a tree-based behavior predictor suitable for implementing various embodiments.

FIG. 3 is a component block and flow diagram illustrating an example tree-based behavior prediction system 300 for implementing a tree-based behavior predictor suitable for implementing various embodiments. With reference to FIGS. 1-3, a processor 104, including an AI processor 124, may be configured to implement the system 300 for implementing the tree-based behavior predictor. In some embodiments, the processor 104 may be a single processor, such as single or multicore processors, multiple distributed processors, such as processors on separate semiconductor dice), and/or remote processors, such as server processors on a cloud computing network. In some embodiments, a vehicle (not shown) may communicate with the processor 104 via V2X technology. In some embodiments, the tree-based behavior prediction system 300 may be integral to the vehicle equipped with any number and combination of peripheral devices (e.g., peripheral devices 122 in FIG. 1) configured to capture the real-world autonomous vehicle run data 304 (e.g., real-world autonomous vehicle run data 202 in FIG. 2).

A real-world autonomous vehicle data gathering module 302 of the tree-based behavior prediction system 300 may gather real-world autonomous vehicle run data 304, which may be accumulated during testing or live operation of the vehicle. The real-world autonomous vehicle run data 304 may include sensor data captured by any number and combination of sensors (not shown) of the peripheral devices. The real-world autonomous vehicle data gathering module 302 may receive the real-world autonomous vehicle run data 304 streamed from the peripheral devices and/or retrieve the real-world autonomous vehicle run data 304 from a memory (e.g., memory 106, 114 in FIG. 1) of the vehicle. The real-world autonomous vehicle run data 304 may be collected during human controlled driving runs, semi-autonomous driving runs, and/or autonomous driving runs. The real-world autonomous vehicle data gathering module 302 may output the real-world autonomous vehicle run data 304 to the tree-based behavior prediction system 300.

A feature identification module 306 of the tree-based behavior prediction system 300 may receive the real-world autonomous vehicle run data 304 as an input. The feature identification module 306 may be configured to analyze the real-world autonomous vehicle run data 304 and determine features of the data 304. For example, the feature identification module 306 may analyze video data to determine visual features, such as neighboring vehicle blinker, neighboring vehicle type, neighboring vehicle position in a lane, lane locations, street markings, street signs, traffic density, obstacles, etc. For another example, the feature identification module 306 may analyze radar or LiDAR data to determine spatial features, such as neighboring vehicle distance from cardinal vehicle, relative forward velocity and/or lateral velocity of neighboring vehicle, traffic density, obstacles, etc. For another example, the feature identification module 306 may analyze GPS data to determine vehicle pose related features, such as direction of travel, forward velocity, location, etc. For another example, the feature identification module 306 may analyze rich semantic map information, such as street configurations, traffic patterns, speed limits, etc. The feature identification module 306 may determine features of any number and combination of the real-world autonomous vehicle run data 304 at a time slice and/or a range of time slices of the data 304. In some embodiments, the feature identification module 306 may use a machine learning model, such as a classification model, to determine the features from the real-world autonomous vehicle run data 304. The feature identification module 306 may associate features with the real-world autonomous vehicle run data 304 and output the associations.

A tree-based behavior prediction model execution module 308 of the tree-based behavior prediction system 300 may be configured to select and execute a tree-based behavior prediction model using the real-world autonomous vehicle run data 304 and the associated features. Tree-based behavior prediction models may be stored in memory (e.g., memory 106, 114 in FIG. 1) and executed by the processor from a text file, a program code or code object, an encrypted text file, etc. In some embodiments, the prediction model execution module 308 may concurrently execute multiple tree-based behavior prediction models. In some embodiments, the prediction model execution module 308 may sequentially execute multiple tree-based behavior prediction models. In some embodiments, the prediction model execution module 308 may cascade multiple tree-based behavior prediction models, to generate a more accurate tree-based behavior prediction model than a single tree-based behavior prediction model.

A tree-based behavior prediction model may include any number and combination of insight decision trees. For example, a tree-based behavior prediction model may include insight decision trees configured for a single insight. For another example, a tree-based behavior prediction model may include insight decision trees configured for multiple related insights, for example, alternative insights, such as a direction turn insight and a forward direction insight, or complementary insights, such as a directional turn insight and a speed change insight. For another example, a tree-based behavior prediction model may include insight decision trees configured for multiple insights related to a feature, for example, insights typically used for a traffic type or pattern.

A tree-based behavior prediction model execution module 308 may include an insight decision tree selection module 310. An insight decision tree selection module 310 of the tree-based behavior prediction system 300 may select any number and combination of tree-based behavior prediction models and/or insight decision trees of the tree-based behavior prediction models for execution using the real-world autonomous vehicle run data 304 and the associated features. For example, the insight decision tree selection module 310 may select tree-based behavior prediction models and/or insight decision trees based on whether the features of the tree-based behavior prediction models and/or insight decision trees correspond with the real-world autonomous vehicle run data 304 and an associated feature.

In some embodiments, the insight decision tree selection module 310 may use additional factors, such as computational load, adaptability, and explainability, to select tree-based behavior prediction models and/or insight decision trees. For example, in response to the processor of the vehicle being under a computational load that exceeds a computational load threshold, the insight decision tree selection module 310 may select tree-based behavior prediction models and/or insight decision trees requiring fewer computations to traverse than a low computation threshold, which may be measured based on number of insight decision trees in a tree-based behavior prediction model, depth of an insight decision tree, and/or number of feature threshold computations for nodes of an insight decision tree.

For another example, in response to characteristics of the features of the real-world autonomous vehicle run data 304, such as confidence scores of the features not exceeding a feature confidence threshold, configured to indicate a confidence in identification of the feature(s), and/or multiple different classifications of a feature type, the insight decision tree selection module 310 may select tree-based behavior prediction models and/or insight decision trees based on adaptability. Uncertainty and/or variation of features of the real-world autonomous vehicle run data 304 may indicate to the insight decision tree selection module 310 a variable nature of environmental conditions surrounding the vehicle. Tree-based behavior prediction models and/or insight decision trees may be suited for adaptability when configured for determining probability of multiple insights and/or being based on multiple features.

For another example, in response to a user setting for a certain level of explainability, the insight decision tree selection module 310 may select tree-based behavior prediction models and/or insight decision trees corresponding with the level of explainability. For example, simpler structure tree-based behavior prediction models and/or insight decision trees, configured for determining probability of fewer insights and/or being based on fewer features than more complex structure tree-based behavior prediction models and/or insight decision trees, may be selected for increasing levels of explainability.

A tree-based behavior prediction model execution module 308 may also include an insight decision tree execution module 312. Each tree-based behavior prediction model may be a forest containing a collection of insight decision trees representing sets of rules and subrules on features. For example, whether data values exceeding a feature boundary may determine down which path of the tree to proceed. An insight decision tree execution module 312 may execute the insight decision trees of the selected tree-based behavior prediction models and/or insight decision trees. In some embodiments, the insight decision tree execution module 312 may concurrently execute multiple insight decision trees. Execution of the insight decision trees may include determining values for the features of the real-world autonomous vehicle run data 304 and determining from the values whether to traverse from a parent node of an insight decision tree to a child node of the insight decision tree. In some embodiments, the determination may be based on a comparison of values of any number and combination of features to any number and combination of corresponding feature thresholds of the parent node. For example, the determination may be based on a comparison of a value of single feature to one or more corresponding feature thresholds of the parent node. The number of possible child nodes may correspond to the number of feature thresholds, and to which child node to traverse may depend on one or more results of a comparison of the value to one or more of the feature thresholds. For another example, the determination may be based on comparisons of values of multiple features to one or more corresponding feature thresholds of the parent node. To which child node to traverse may depend on a combination of results of the comparisons of the values to the corresponding feature thresholds. In some embodiments the determination may be based on a comparison of a value representative of any number and combination of features to a corresponding feature threshold of the parent node. For example, the value representative of multiple features may be a result of a weighted algorithm computed using the multiple features.

The insight decision tree execution module 312 may traverse an insight decision tree to an end node, not having any children nodes. The end node may be associated with a probability of the insight of the insight decision tree based on the features used to traverse the insight decision tree. The end node may be associated with a confidence score of the probability of the insight. The insight decision tree may be associated with a confidence score of all probabilities of the insight of the insight decision tree. The insight decision tree execution module 312 may output the insight probability and confidence score 314 of the execution of an insight decision tree. In some embodiments the confidence score may include one or both of the confidence score of the probability of the insight and the confidence score of all probabilities of the insight of the insight decision tree. In some embodiments, the confidence score may include a value representative of the confidence score of the probability of the insight and the confidence score of all probabilities of the insight of the insight decision tree, which may be a result of a weighted algorithm computed using the multiple confidence scores.

Figure 4A:
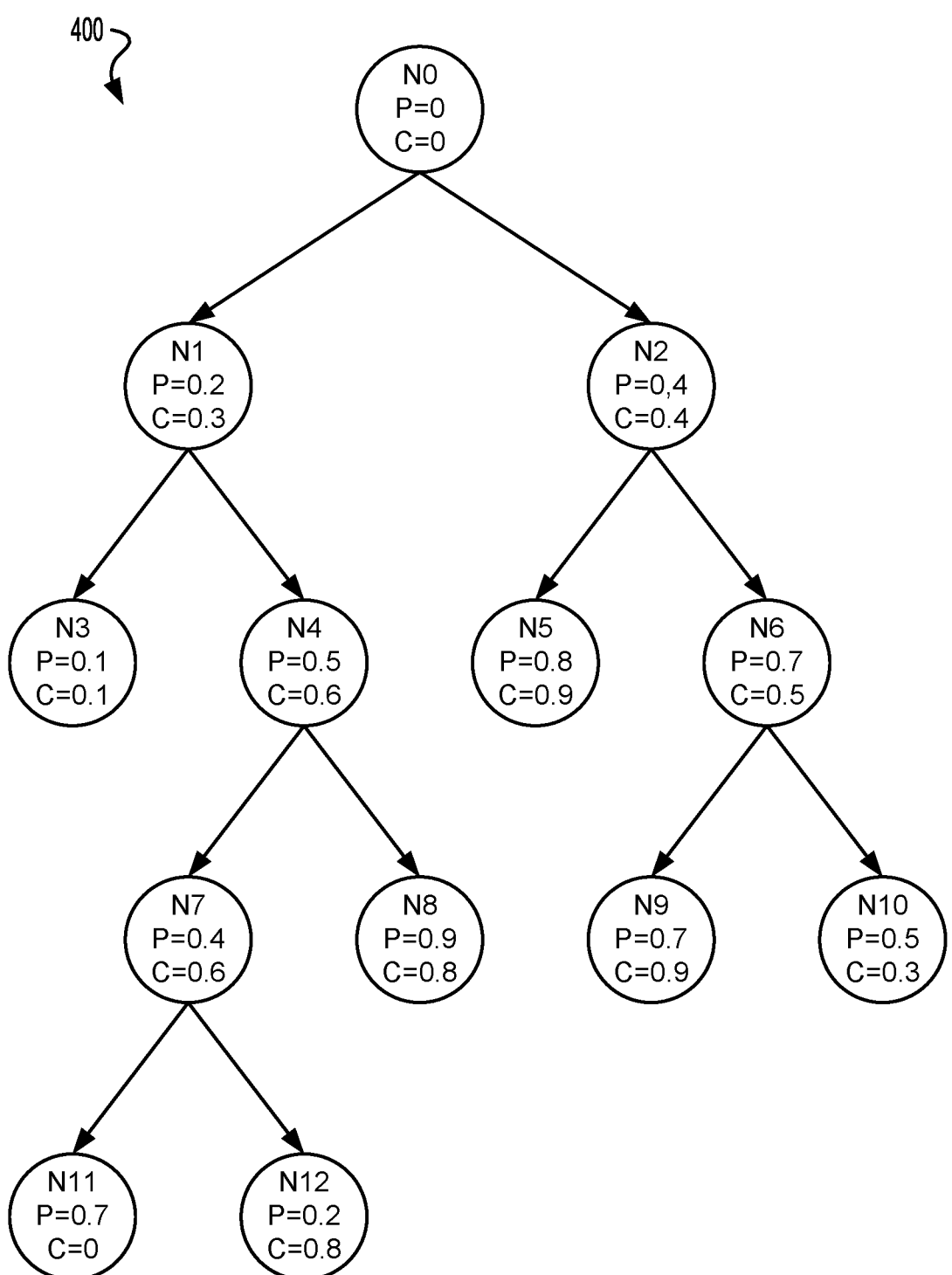
FIG. 4A is a flow and graph diagram illustrating an example tree-based behavior predictor suitable for implementing various embodiments.

FIG. 4A is a flow and graph diagram 400 illustrating an example insight decision tree of a tree-based behavior predictor suitable for implementing various embodiments. With reference to FIGS. 1-4A, the graph diagram 400 illustrates an example insight decision tree having 13 nodes (e.g., N0-N12), for which each node is associated with a probability "P" measured on a scale of 0 to 1, and a confidence score "C" measured on a scale of 0 to 1. Traversing from a parent node to a child node (e.g., from N0 to N1 or N2) may be based on comparisons of feature values to feature thresholds as described herein. Traversing to an end node may result in outputting the probability and confidence score of the end node for the insight of the insight decision tree.

Training the tree-based behavior predictor may include updating the probability and/or confidence score of any of the nodes. In some embodiments, training the tree-based behavior predictor may include adding any number and combination of child nodes to any parent node, including the associated probability and/or confidence score, and updating or adding factor threshold(s) of the parent node. In some embodiments, training the tree-based behavior predictor may include removing any number and combination of child nodes from any parent node, including the associated probability and/or confidence score, and updating the factor threshold(s) of the parent node. In some embodiments, training the tree-based behavior predictor may include removing the entire insight decision tree. Determining whether to remove a node and/or an insight decision tree may be based on a confidence threshold, for which a node and/or an insight decision tree associated with a confidence score not exceeding the confidence threshold may be removed. Determining whether to remove a node and/or an insight decision tree may be based on an amount threshold, for which a number of nodes in an insight decision tree and/or a number of insight decision trees exceeds the amount threshold, a node and/or an insight decision tree associated with a confidence score not exceeding the confidence threshold may be removed.

Figure 4B:
FIG. 4B is a pseudocode diagram illustrating an example tree-based behavior predictor suitable for implementing various embodiments.

FIG. 4B is a pseudocode diagram 410 illustrating an example tree-based behavior predictor suitable for implementing various embodiments. With reference to FIGS. 1-4B, the pseudocode diagram 410 illustrates an example tree-based behavior predictor for "lane keep", "left lane change", "right lane change" behavior predictors, or insight decision trees. Each behavior predictor may produce a score, such as a probability or derivation thereof, for example a value incorporating the probability and a confidence score, for the behavior, or insight, of the respective behavior predictor. The example uses "Dlat" and "Vlat" features of real-world autonomous vehicle run data (e.g., real-world autonomous vehicle run data 202, 304 in FIGS. 2 and 3). to determine how to traverse the insight decision trees.

For example, the illustrated lane keep insight decision tree is based on the Dlat feature. Stating at a root node "0" of the lane keep insight decision tree, in response to a Dlat value less than 512, "yes", the lane keep insight decision tree may be traversed to a first child node, "1 leaf". In response to a Dlat value that is not less than 512, "no", the lane keep insight decision tree may be traversed to a second child node, "2 leaf". In response to no Dlat value, "missing", the lane keep insight decision tree may be traversed to the first child node, "1 leaf". Traversing to the first child node, "1 leaf", may result in a score of 1.34455478 for a lane keep insight, and traversing to the second child node, "2 leaf", may result in a score of 0.265982389 for the lane keep insight. A greater value score may indicate a greater likelihood of the lane keep insight.

The illustrated example left lane change insight decision tree is based on the Vlat feature. Stating at a root node "0" of the left lane change insight decision tree, in response to a Vlat value less than –512, "yes", the left lane change insight decision tree may be traversed to a first child node, "1 leaf". In response to a Vlat value that is not less than –512, "no", the left lane change insight decision tree may be traversed to a second child node, "2 leaf". In response to no Vlat value, "missing", the left lane change insight decision tree may be traversed to the first child node, "1 leaf". Traversing to the first child node, "1 leaf", may result in a score of 0.0188203566 for a left lane change insight, and traversing to the second child node, "2 leaf", may result in a score of –0.706938148 for the left lane change insight. A greater value score may indicate a greater likelihood of the left lane change insight.

The illustrated example right lane change insight decision tree is based on the Dlat feature. Stating at a root node "0" of the right lane change insight decision tree, in response to a Dlat value less than 512, "yes", the right lane change insight decision tree may be traversed to a first child node, "1 leaf". In response to a Dlat value that is not less than 512, "no", the right lane change insight decision tree may be traversed to a second child node, "2 leaf". In response to no Dlat value, "missing", the right lane change insight decision tree may be traversed to the first child node, "1 leaf". Traversing to the first child node, "1 leaf", may result in a score of −0.696153462 for a right lane change insight, and traversing to the second child node, "2 leaf", may result in a score of 0.448868513 for the right lane change insight. A greater value score may indicate a greater likelihood of the right lane change insight.

Each of the illustrated example insight decision trees, lane keep, left lane change, and right lane change, may be traversed and a greater value score among the multiple insight decision trees may indicate a greater likelihood of the respective insight. For example, traversing the lane keep insight decision tree to the first child node, "1 leaf", may indicate a greater likelihood of the lane keep insight than any of the outcomes of traversing the left lane change insight decision tree and the right lane change insight decision tree.

The example pseudocode diagram 410 illustrated in FIG. 4B is simplified for the sake of explainability and clarity, and is not intended to limit the scope of the claims. As described herein, any number and combination of tree-based behavior prediction models may include any number and combination of insight decision trees for any number and combination of insights, having any number of nodes, and based on any number and combination of features.

Figure 5:
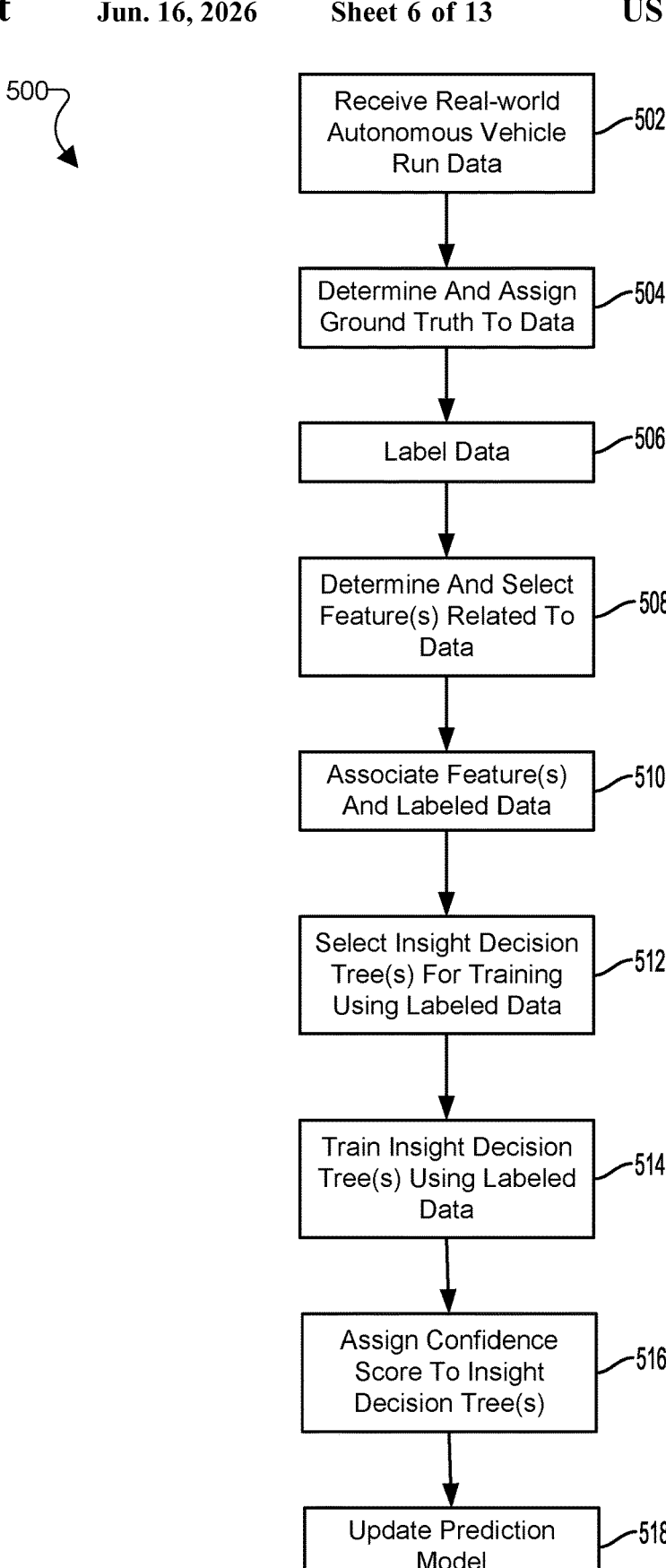
FIG. 5 is a process flow diagram illustrating a method for training a tree-based behavior predictor according to an embodiment.

FIG. 5 illustrates a method 500 for training a tree-based behavior predictor according to an embodiment. With reference to FIGS. 1-5, the method 500 may be implemented in a computing device (e.g., computing device 100 in FIG. 1), in general purpose hardware, in dedicated hardware, in software executing in a processor (e.g., processor 104 or AI processor 124 in FIG. 1), or in a combination of a software-configured processor and dedicated hardware. For example, the method 500 may be implemented as a processor (e.g., processor 104, AI processor 124 in FIG. 1) executing software within a tree-based behavior prediction system for training a tree-based behavior predictor (e.g., tree-based behavior prediction system 200 in FIG. 2) that includes other individual components, and various memory/cache controllers. In some embodiments, the processor may be a single processor, such as single or multicore processors, multiple distributed processors, such as processors on separate semiconductor dice), and/or remote processors, such as server processors on a cloud computing network. In some embodiments, a vehicle may communicate with the processor via V2X technology. In order to encompass the alternative configurations enabled in various embodiments, the hardware implementing the method 500 is referred to herein as an "processing device."

In block 502, the processing device may receive real-world autonomous vehicle run data (e.g., real-world autonomous vehicle run data 202 in FIG. 2). The real-world autonomous vehicle run data may be accumulated during testing or live operation of a vehicle equipped with any number and combination of peripheral devices (e.g., periph-eral devices 122 in FIG. 1) configured to capture the real-world autonomous vehicle run data. The real-world autonomous vehicle run data may be collected during human controlled driving runs, semi-autonomous driving runs, and/or autonomous driving runs. In some embodiments, the processing device may be integral to the vehicle and the processing device may access the real-world autonomous vehicle run data from a memory (e.g., memory 106, 114 in FIG. 1) of the vehicle. In some embodiments, the processing device may be separate from the vehicle and the processing device may receive the real-world autonomous vehicle run data via a wired or wireless communication system (e.g., communication interface 108, communication component 112, antenna 116 in FIG. 1) of the computing device. The real-world autonomous vehicle run data may include sensor data captured by any number and combination of sensors of the peripheral devices. In some embodiments, the processing device receiving the real-world autonomous vehicle run data in block 502 may be a processor, such as an AI processor.

In block 504, the processing device may determine and assigning a ground truth insight to the real-world autono-mous vehicle run data. A ground truth insight may be an insight relating to the real-world autonomous vehicle run data known to be a true. In some embodiments, the pro-cessing device may determine the ground truth insight and label the real-world autonomous vehicle run data at a time slice of an occurrence of the ground truth insight. In some embodiments, a user may input a ground truth insight for a time slice of an occurrence of the ground truth insight, and the processing device may determine the ground truth insight from the user entry and label the real-world autono-mous vehicle run data at the time slice of the occurrence of the ground truth insight. In some embodiments, the process-ing device determining and assigning the ground truth insight to the real-world autonomous vehicle run data in block 504 may be a processor, such as an AI processor.

In block 506, the processing device may label the real-world autonomous vehicle run data. The processing device may be configured to apply labels of various insights to the real-world autonomous vehicle run data. For example, the labels may be applied to the real-world autonomous vehicle run data at different time slices for the data over a length of time that the data spans. The length of time may be a length of time preceding the ground truth insight, such as approxi-mately 2 seconds. In some embodiments, the preceding labels may be selected by the processing device based on an insight associated with a highest probability and/or confi-dence of the real-world autonomous vehicle run data at a time slice as determined by execution of an insight decision tree. The insight decision tree applied to the real-world autonomous vehicle run data at the time slice may be selected by the processing device. For example, the process-ing device may select and apply an insight decision tree for determining probabilities of the type of insight of the ground truth insight. For another example, the processing device may select and apply multiple insight decision trees and select labels based on the type of insight of an insight decision tree resulting in a highest probability and/or con-fidence score for the real-world autonomous vehicle run data at the time slice. For another example, the processing device may select and apply multiple insight decision trees based on features of the real-world autonomous vehicle run data that the insight decision trees are configured to process. The multiple insight decision trees may be insight decision trees for determining probabilities of types of insights that typi-cally precede the ground truth insight. The multiple insight decision trees may be insight decision trees for determining probabilities of types of insights specified by a user. In some embodiments, the processing device may label the real-world autonomous vehicle run data using labels and/or time slices designated by a user. In some embodiments, the processing device labeling the real-world autonomous vehicle run data in block 506 may be a processor, such as an AI processor.

In block 508, the processing device may determine fea-ture(s) related to the real-world autonomous vehicle run data. The processing device may be configured to analyze the real-world autonomous vehicle run data preceding the ground truth insight and determine a feature(s) of the data.

The processing device may determine features of any number and combination of the real-world autonomous vehicle run data at a time slice and/or a range of time slices of the data. In some embodiments, the processing device may use a machine learning model, such as a classification model, to determine the feature(s) from the real-world autonomous vehicle run data. The processing device may associate the feature(s) with the real-world autonomous vehicle run data. In some embodiments, the processing device determining the feature(s) related to the real-world autonomous vehicle run data in block 508 may be a processor, such as an AI processor.

In block 510, the processing device may associate the feature(s) of the real-world autonomous vehicle run data with the labeled data. The processing device may generate an associated features and labeled data structure (e.g., associated features and labeled data structure 210 in FIG. 2), which may be a data structure, such as a database, list, array, etc., associating the real-world autonomous vehicle run data, the feature(s) of the data, and the labels of the data. In some embodiments, the processing device may associate individual time slices of the real-world autonomous vehicle run data with the feature(s) and the label(s) of the data. In some embodiments, the processing device may associate a range of multiple time slices of the real-world autonomous vehicle run data with the feature(s) and the label(s) of the data for data having the same feature(s) and label(s). In some embodiments, the processing device associating the feature(s) of the real-world autonomous vehicle run data with the labeled data in block 510 may be a processor, such as an AI processor.

In block 512, the processing device may selected insight decision tree(s) for training using the labeled data. A tree-based behavior prediction model may include any number and combination of insight decision trees. The processing device may select any number and combination of tree-based behavior prediction model(s) and/or insight decision tree(s) of the tree-based behavior prediction models for training using the information of the associated features and labeled data structure. For example, the processing device may select tree-based behavior prediction model(s) and/or insight decision tree(s) based on whether the insights of the tree-based behavior prediction model(s) and/or insight decision tree(s) correspond with a label of the associated features and labeled data structure. For another example, the processing device may select tree-based behavior prediction model(s) and/or insight decision tree(s) based on whether the features of the tree-based behavior prediction model(s) and/or insight decision tree(s) correspond with a feature of the associated features and labeled data structure. In some embodiments, the processing device selecting insight decision tree(s) for training using the labeled data in block 512 may be a processor, such as an AI processor.

In block 514, the processing device may train the selected insight decision tree(s) using the labeled data. The processing device may train the insight decision tree(s) of the tree-based behavior prediction models selected in block 512. The processing device may use the information of the associated features and labeled data structure to train the insight decision tree(s). For example, the labeled data with a label of an insight may be used to train insight decision tree(s) configured for determining a probability of the same and/or related insight. For another example, the labeled data associated with any number and combination of features may be used to train insight decision tree(s) configured for determining a probability of an insight using at least one of the features associated with the labeled data. The processing device may use various means for training the insight decision trees, such as gradient boosting. In some embodiments, the processing device training the insight decision tree(s) using the labeled data in block 514 may be a processor, such as an AI processor.

In block 516, the processing device may assign a confidence score to the insight decision tree(s). The processing device may be configured to assign a confidence score to an entire insight decision tree(s) and/or an individual node(s) of an insight decision tree based on various factors. For example, a confidence score may be based on number of training iterations run for, an age of the insight decision tree and/or the node, and/or a number of confirmed predictions for the insight decision tree and/or the node, where higher values of the factors may correspond to higher confidence scores as compared to lower values of the factors corresponding to lower confidence scores. For another example, a confidence score may be based a user observation of the insight decision tree and/or the node. In some embodiments, assigning the confidence score may include updating a previous confidence score. In some embodiments, the processing device assigning the confidence score to the insight decision tree(s) in block 516 may be a processor, such as an AI processor.

In block 518, the processing device may update a tree-based behavior prediction model. Updates to the tree-based behavior prediction model may include the changes made to the insight decision tree(s) of the tree-based behavior prediction model resulting from the training of the confidence insight decision tree(s) in block 514 and assignment of the confidence score in block 516. The processing device may store the updates to the tree-based behavior prediction model to a memory (e.g., memory 106, 114 in FIG. 1) of the computing device. In some embodiments, the processing device updating the tree-based behavior prediction model in block 518 may be a processor, such as an AI processor.

Figure 6A:
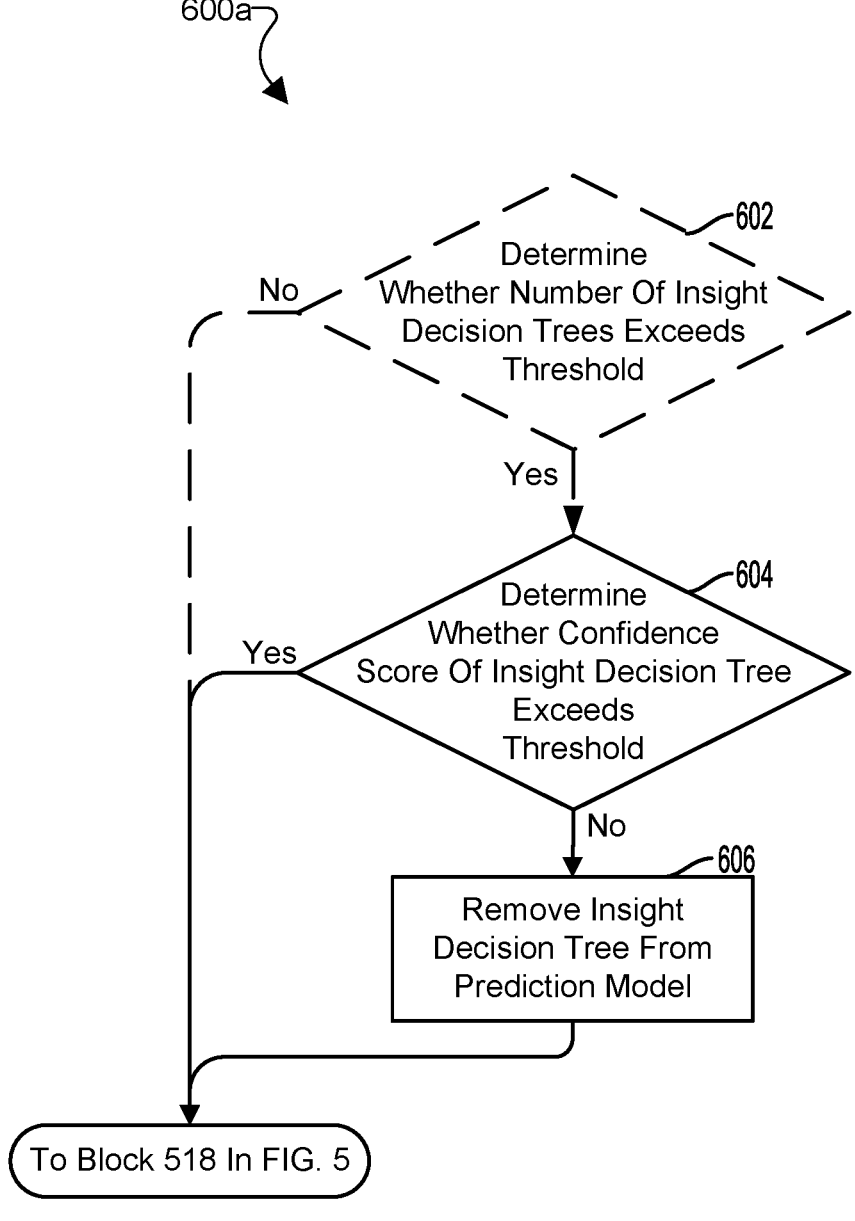
FIGS. 6A and 6B is a process flow diagram illustrating a method for training a tree-based behavior predictor according to an embodiment.
Figure 6B:
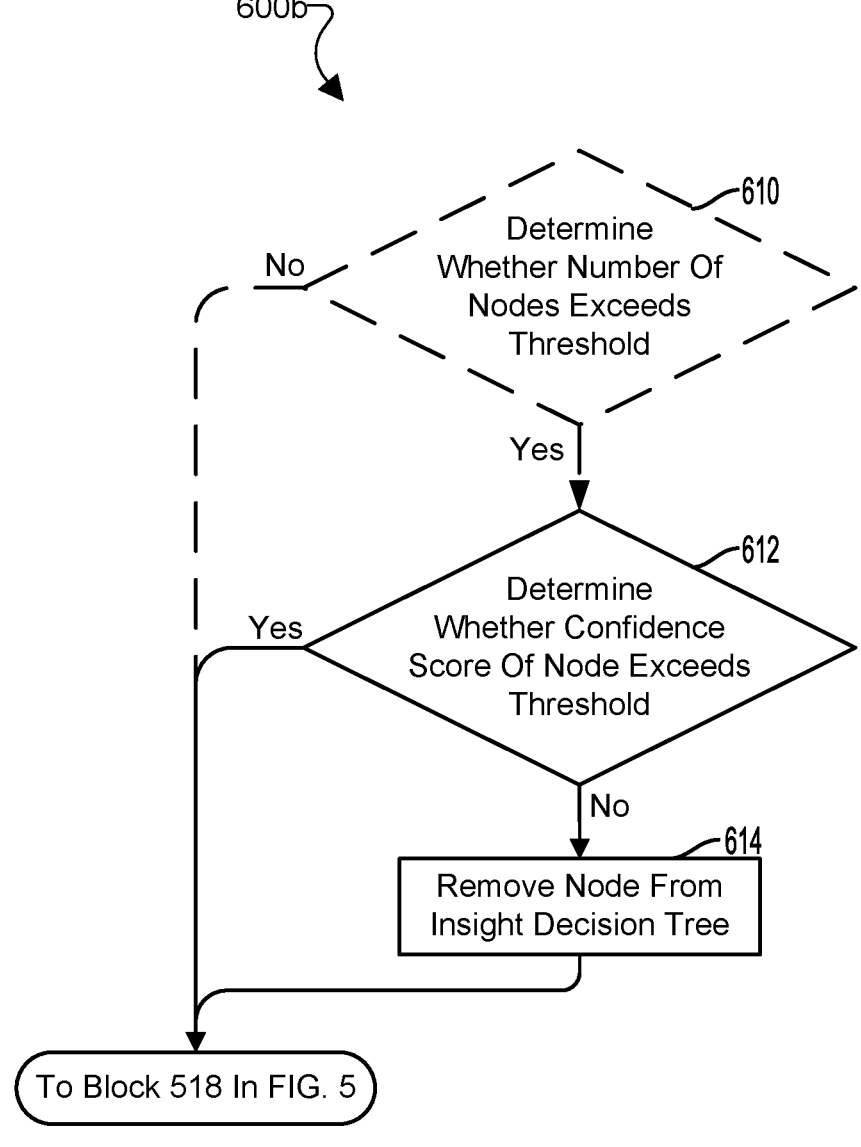

FIGS. 6A and 6B illustrates a methods 600a, 600b for training a tree-based behavior predictor according to an embodiment. With reference to FIGS. 1-6B, the methods 600a, 600b may be implemented in a computing device (e.g., computing device 100 in FIG. 1), in general purpose hardware, in dedicated hardware, in software executing in a processor (e.g., processor 104 or AI processor 124 in FIG. 1), or in a combination of a software-configured processor and dedicated hardware. For example, the methods 600a, 600b may be implemented as a processor (e.g., processor 104, AI processor 124 in FIG. 1) executing software within a tree-based behavior prediction system for training a tree-based behavior predictor (e.g., tree-based behavior prediction system 200 in FIG. 2) that includes other individual components, and various memory/cache controllers. In some embodiments, the processor may be a single processor, such as single or multicore processors, multiple distributed processors, such as processors on separate semiconductor dice), and/or remote processors, such as server processors on a cloud computing network. In some embodiments, a vehicle may communicate with the processor via V2X technology. In order to encompass the alternative configurations enabled in various embodiments, the hardware implementing the methods 600a, 600b is referred to herein as an "processing device." The methods 600a, 600b may further describe blocks 514, 516 of the method 500 described with reference to FIG. 5.

With reference to FIG. 6A, in optional determination block 602, the processing device may determine whether a number of insight decision trees exceeds an amount threshold. In some embodiments the amount threshold may be a value representing a threshold number of insight decision trees for a tree-based behavior prediction model, for which a value exceeding the amount threshold may indicate to the processing device that an insight decision tree may be removed from the tree-based behavior prediction model. The processing device may compare the number of the insight decision trees for the tree-based behavior prediction model to the amount threshold. In some embodiments, the processing device determining whether the number of insight decision trees exceeds the amount threshold in optional determination block 602 may be a processor, such as an AI processor.

In response to determining that the number of insight decision trees exceeds the amount threshold (i.e., optional determination block 602="Yes"); or in a separate instance, the processing device may determine whether a confidence score of an insight decision tree exceeds a confidence threshold in determination block 604. The confidence threshold may be a value representing a threshold confidence score of insight decision trees. The processing device may compare a confidence score of the insight decision tree to the confidence threshold. A value of the confidence score not exceeding the confidence threshold may indicate to the processing device that the insight decision tree may be removed from the tree-based behavior prediction model. In some embodiments, the processing device determining whether the confidence score of the insight decision tree exceeds the confidence threshold in determination block 604 may be a processor, such as an AI processor.

In response to determining that the number of insight decision trees does not exceed the amount threshold (i.e., optional determination block 602="No"); and/or in response to determining that the confidence score of the insight decision tree exceeds the confidence threshold (i.e., determination block 604="Yes"), the processing device may update the tree-based behavior prediction model in block 518 of the method 500 described with reference to FIG. 5. In some embodiments, the processing device updating the tree-based behavior prediction model in block 518 may be a processor, such as an AI processor.

In response to determining that the confidence score of the insight decision tree does not exceed the confidence threshold (i.e., determination block 604="No"), the processing device may remove the insight decision tree from the scores tree-based behavior prediction model in block 606. In some embodiments, the processing device removing the insight decision tree from the scores tree-based behavior prediction model in block 606 may be a processor, such as an AI processor. Subsequently or concurrently, the processing device may update the tree-based behavior prediction model in block 518 of the method 500 described with reference to FIG. 5. In some embodiments, the processing device updating the tree-based behavior prediction model in block 518 may be a processor, such as an AI processor.

With reference to FIG. 6B, in optional determination block 610, the processing device may determine whether a number of nodes of an insight decision tree exceeds an amount threshold. In some embodiments the amount threshold may be a value representing a threshold number of nodes for an insight decision tree, for which a value exceeding the amount threshold may indicate to the processing device that a node may be removed from the insight decision tree. The processing device may compare the number of the nodes of the insight decision tree to the amount threshold. In some embodiments, the processing device determining whether the number of nodes of the insight decision tree exceeds the amount threshold in optional determination block 610 may be a processor, such as an AI processor.

In response to determining that the number of nodes of the insight decision tree exceeds the amount threshold (i.e., optional determination block 610="Yes"); or in a separate instance, the processing device may determine whether a confidence score of a node of the insight decision tree exceeds a confidence threshold in determination block 612. The confidence threshold may be a value representing a threshold confidence score of nodes. The processing device may compare a confidence score of the node of the insight decision tree to the confidence threshold. A value of a confidence score not exceeding the confidence threshold may indicate to the processing device that the node may be removed from the insight decision tree. In some embodiments, the processing device determining whether the confidence score of the node of the insight decision tree exceeds the confidence threshold in determination block 612 may be a processor, such as an AI processor.

In response to determining that the number of nodes of the insight decision tree does not exceed the amount threshold (i.e., optional determination block 610="No"); and/or in response to determining that the confidence score of the node of the insight decision tree exceeds the confidence threshold (i.e., determination block 612="Yes"), the processing device may update the tree-based behavior prediction model in block 518 of the method 500 described with reference to FIG. 5. In some embodiments, the processing device updating the tree-based behavior prediction model in block 518 may be a processor, such as an AI processor.

In response to determining that the confidence score of the node of the insight decision tree does not exceed the confidence threshold (i.e., determination block 612="No"), the processing device may remove the node from the insight decision tree in block 614. In some embodiments, the processing device removing the node from the insight decision tree in block 614 may be a processor, such as an AI processor. Subsequently or concurrently, the processing device may update the tree-based behavior prediction model in block 518 of the method 500 described with reference to FIG. 5. In some embodiments, the processing device updating the tree-based behavior prediction model in block 518 may be a processor, such as an AI processor.

Figure 7:
FIG. 7 is a process flow diagram illustrating a method for implementing a tree-based behavior predictor according to an embodiment.
Figure 7:
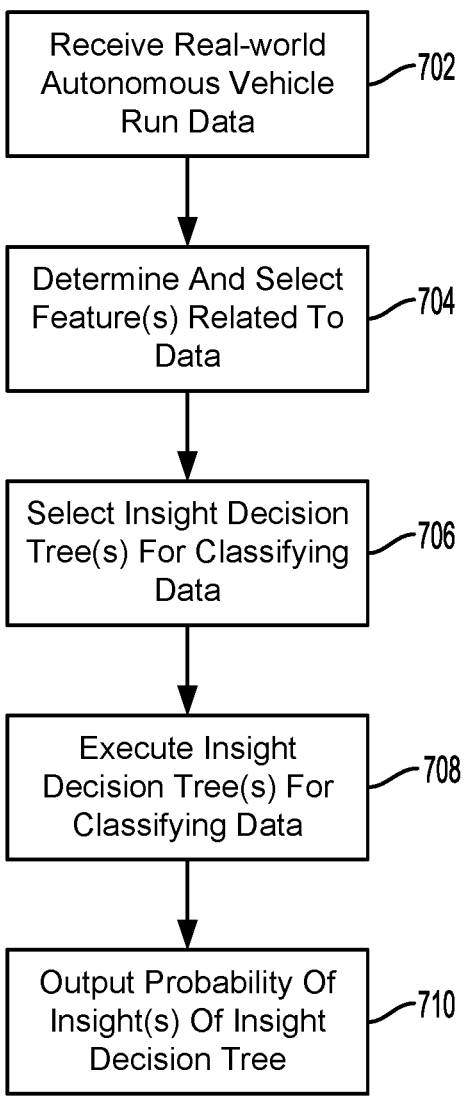

FIG. 7 illustrates a method 700 for implementing a tree-based behavior predictor according to an embodiment. With reference to FIGS. 1-7, the method 700 may be implemented in a computing device (e.g., computing device 100 in FIG. 1), in general purpose hardware, in dedicated hardware, in software executing in a processor (e.g., processor 104 or AI processor 124 in FIG. 1), or in a combination of a software-configured processor and dedicated hardware. For example, the method 700 may be implemented as a processor (e.g., processor 104, AI processor 124 in FIG. 1) executing software within a tree-based behavior prediction system for implementing a tree-based behavior predictor (e.g., tree-based behavior prediction system 300 in FIG. 3) that includes other individual components, and various memory/cache controllers. In some embodiments, the processor may be a single processor, such as single or multicore processors, multiple distributed processors, such as processors on separate semiconductor dice), and/or remote processors, such as server processors on a cloud computing network. In some embodiments, a vehicle may communicate with the processor via V2X technology. In order to encompass the alternative configurations enabled in various embodiments, the hardware implementing the method 700 is referred to herein as an "processing device."

In block 702, the processing device may receive real-world autonomous vehicle data (e.g., real-world autonomous vehicle run data 304 in FIG. 3). The real-world autonomous vehicle run data may be accumulated during testing or live operation of a vehicle equipped with any number and combination of peripheral devices (e.g., peripheral devices 122 in FIG. 1) configured to capture the real-world autonomous vehicle run data. The real-world autonomous vehicle run data 304 may include sensor data captured by any number and combination of sensors of the peripheral devices. The processing device may receive the real-world autonomous vehicle run data streamed from the peripheral devices and/or retrieve the real-world autonomous vehicle run data from a memory (e.g., memory 106, 114 in FIG. 1) of the vehicle. The real-world autonomous vehicle run data may be collected during human controlled driving runs, semi-autonomous driving runs, and/or autonomous driving runs. In some embodiments, the processing device receiving the real-world autonomous vehicle data in block 702 may be a processor, such as an AI processor.

In block 704, the processing device may determine and select a feature(s) related to the real-world autonomous vehicle data. The processing device may be configured to analyze the real-world autonomous vehicle run data and determine the feature(s) of the data. The processing device may determine the feature(s) of any number and combination of the real-world autonomous vehicle run data at a time slice and/or a range of time slices of the data. In some embodiments, the processing device may use a machine learning model, such as a classification model, to determine the feature(s) from the real-world autonomous vehicle run data. The processing device may associate features with the real-world autonomous vehicle run data and output the associations. In some embodiments, the processing device determining and selecting the feature(s) related to the real-world autonomous vehicle data in block 704 may be a processor, such as an AI processor.

In block 706, the processing device may select an insight decision tree(s) for classifying the scores real-world autonomous vehicle data. In some embodiments, the processing device selecting the insight decision tree(s) for classifying the scores real-world autonomous vehicle data in block 706 may be a processor, such as an AI processor. A tree-based behavior prediction model may include any number and combination of insight decision trees. The processing device select any number and combination of tree-based behavior prediction models and/or insight decision trees of the tree-based behavior prediction models for execution using the real-world autonomous vehicle run data and the associated features. For example, processing device may select a tree-based behavior prediction model(s) and/or an insight decision tree(s) based on whether the features of the tree-based behavior prediction model(s) and/or insight decision tree(s) correspond with the real-world autonomous vehicle run data and at least one associated feature.

In some embodiments, the processing device may use additional factors, such as computational load, adaptability, and explainability, to select the tree-based behavior prediction model(s) and/or insight decision tree(s). For example, in response to a processor (e.g., processor 104 or AI processor 124 in FIG. 1) of the vehicle being under a computational load that exceeds a computational load threshold, the processing device may select the tree-based behavior prediction model(s) and/or insight decision tree(s) requiring fewer computations to traverse than a low computation threshold, which may be measured based on number of insight decision trees in a tree-based behavior prediction model, depth of an insight decision tree, and/or number of feature threshold computations for nodes of an insight decision tree.

For another example, in response to characteristics of the feature(s) of the real-world autonomous vehicle run data, such as a confidence score(s) of the feature(s) not exceeding a feature confidence threshold, configured to indicate a confidence in identification of the feature(s), and/or multiple different classifications of a feature type, the processing device may select the tree-based behavior prediction model(s) and/or insight decision tree(s) based on adaptability. Uncertainty and/or variation of features of the real-world autonomous vehicle run data may indicate to the processing device a variable nature of environmental conditions surrounding the vehicle. Tree-based behavior prediction models and/or insight decision trees may be suited for adaptability when configured for determining probability of multiple insights and/or being based on multiple features.

For another example, in response to a user setting for a certain level of explainability, the processing device may select tree-based behavior prediction model(s) and/or insight decision tree(s) corresponding with the level of explainability. For example, simpler structure tree-based behavior prediction models and/or insight decision trees, configured for determining probability of fewer insights and/or being based on fewer features than more complex structure tree-based behavior prediction models and/or insight decision trees, may be selected for increasing levels of explainability.

In block 708, the processing device may execute the insight decision tree(s) for classifying the real-world autonomous vehicle data. In some embodiments, the processing device may concurrently execute multiple insight decision trees. Execution of the insight decision trees may include determining values for the features of the real-world autonomous vehicle run data and determining from the values whether to traverse from a parent node of an insight decision tree to a child node of the insight decision tree. In some embodiments, the determination may be based on a comparison of values of any number and combination of features to any number and combination of corresponding feature thresholds of the parent node. To which child node to traverse may depend on one or more results of a comparison of one or more values to one or more of the feature thresholds. In some embodiments the determination may be based on a comparison of a value representative of any number and combination of features to a corresponding feature threshold of the parent node. For example, the value representative of multiple features may be a result of a weighted algorithm computed using the multiple features. The processing device may traverse the insight decision tree(s) to an end node, not having any children nodes. The end node may be associated with a probability of the insight of the insight decision tree(s) based on the features used to traverse the insight decision tree(s). The end node may be associated with a confidence score of the probability of the insight. The insight decision tree(s) may be associated with a confidence score of all probabilities of the insight of the insight decision tree(s). In some embodiments, the processing device executing the insight decision tree(s) for classifying the real-world autonomous vehicle data in block 708 may be a processor, such as an AI processor.

In block 710, the processing device may output a probability of one or more insights of the insight decision tree(s). The processing device may output the probability of the end node reached by traversing the insight decision tree(s). In some embodiments, the processing device may output a confidence score of the execution of the insight decision tree(s). In some embodiments the confidence score may include one or both of the confidence score of the probability of the insight, i.e., the confidence score associated with the end node reached by traversing the insight decision tree(s), and the confidence score of all probabilities of the insight of the insight decision tree(s), i.e., the confidence score associated with the insight decision tree(s). In some embodiments, the confidence score may include a value representative of the confidence score of the probability of the insight and the confidence score of all probabilities of the insight of the insight decision tree, which may be a result of a weighted algorithm computed using the multiple confidence scores. In some embodiments, the processing device outputting the probability of one or more insights of the insight decision tree(s) in block 710 may be a processor, such as an AI processor.

In some embodiments, the processing device may concurrently execute multiple instances of any combination of the blocks 702-710 for multiple tree-based behavior prediction models. In some embodiments, the processing device may sequentially execute multiple instances of any combination of the blocks 702-710 for multiple tree-based behavior prediction models. In some embodiments, the processing device may cascade multiple tree-based behavior prediction models, executing multiple instances of any combination of the blocks 702-710 for the multiple tree-based behavior prediction models, to generate a more accurate tree-based behavior prediction model than a single tree-based behavior prediction model.

Figure 8A:
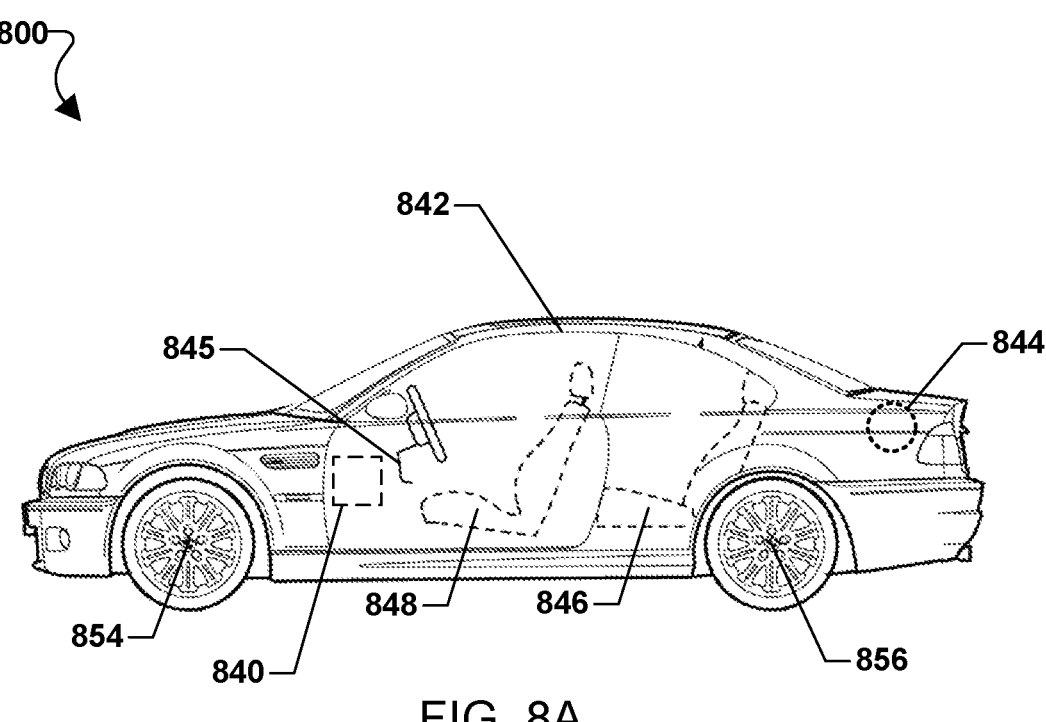
FIGS. 8A-8C are component block diagrams illustrating an example embedded vehicle computing system suitable for implementing various embodiments.
Figure 8B:
Figure 8B:
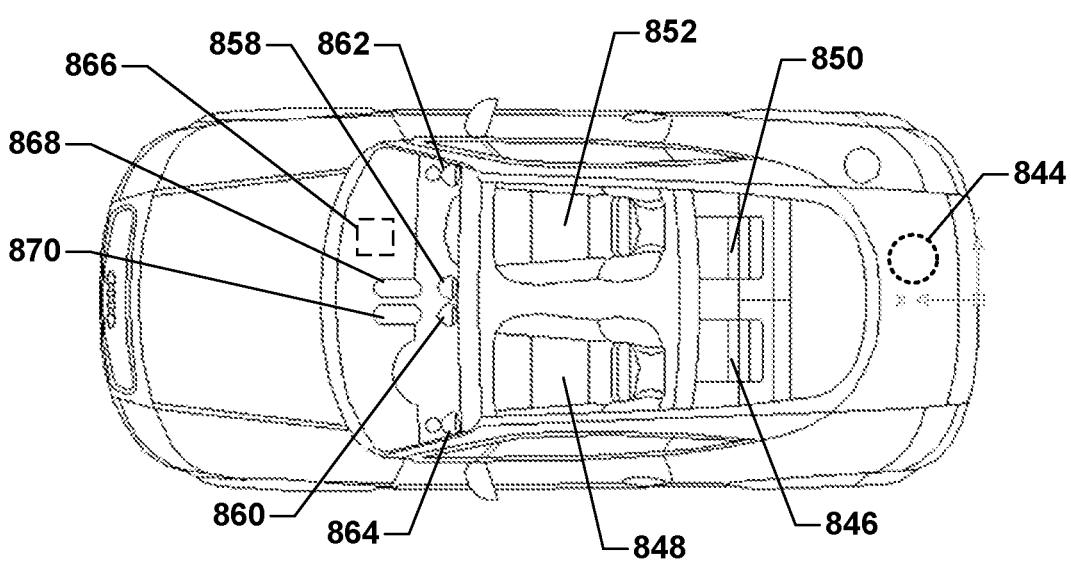
Figure 8C:
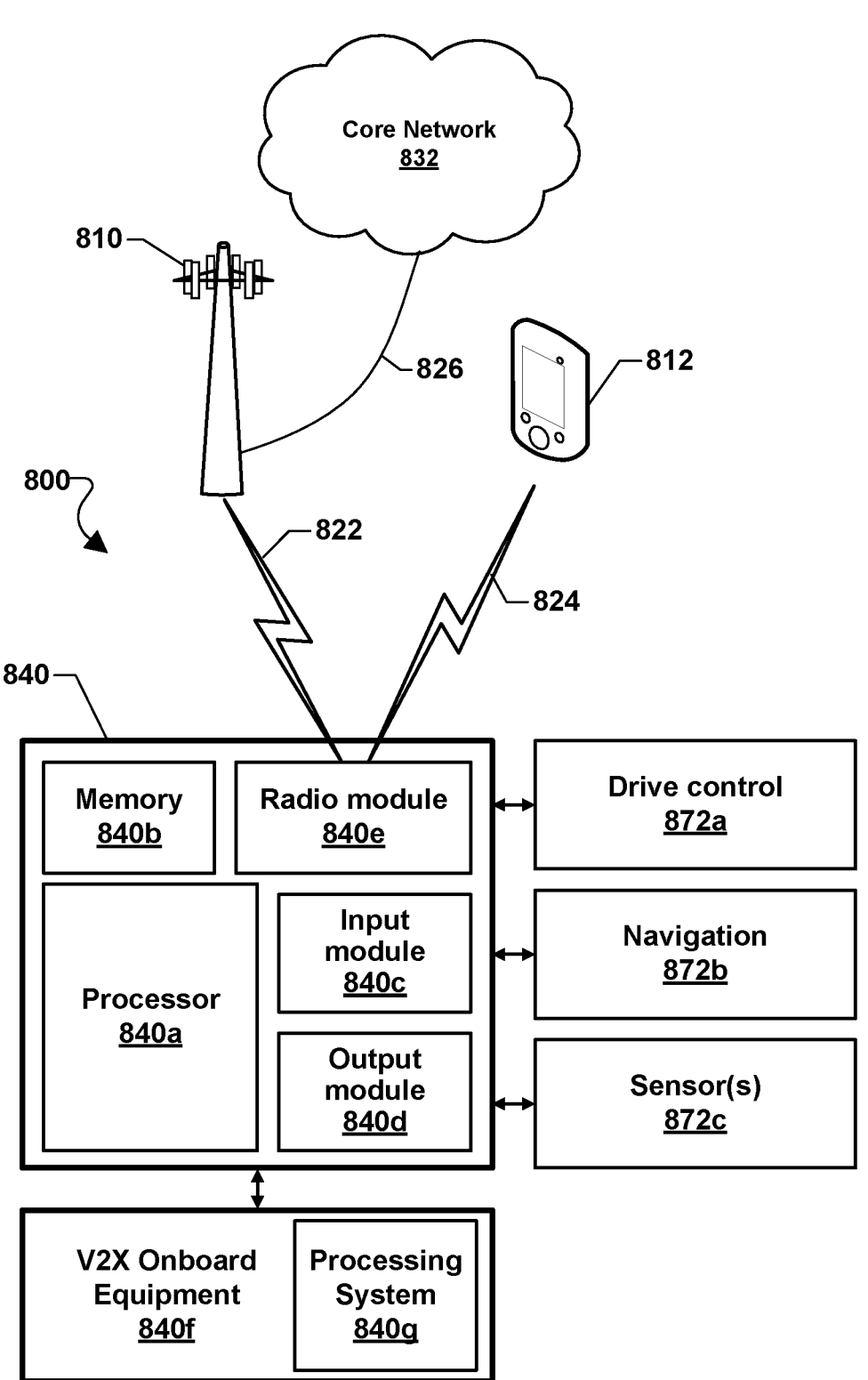

Methods and devices for implementing such methods in accordance with the various embodiments (including, but not limited to, embodiments described above with reference to FIGS. 1-7) may be implemented in a wide variety of computing systems including an embedded vehicle computing system 800 an example of which is illustrated in FIGS. 8A-8C. An embedded vehicle computing system 800 may include a vehicle control unit 840, which may include a processor, such as a CPU, an AI processor, etc. The embedded vehicle computing system 800 may include a plurality of sensors 842-870, including satellite geopositioning system receivers 842, accelerometers 844, occupancy sensors 846, 848, 850, 852, tire pressure sensors 854, 856, cameras 858, 860, microphones 862, 864, impact sensors 866, radar 868, and LiDAR 870.

The plurality of sensors 842-870, disposed in or on the vehicle, may be used for various purposes, such as autonomous and semi-autonomous navigation and control, crash avoidance, position determination, etc., as well to provide sensor data regarding objects and people in or on the vehicle. The sensors 842-870 may include one or more of a wide variety of sensors capable of detecting a variety of information useful for navigation and collision avoidance. Each of the sensors 842-870 may be in wired or wireless communication with a control unit 840, as well as with each other. In particular, the sensors may include one or more cameras 858, 860 or other optical sensors or photo optic sensors. The sensors may further include other types of object detection and ranging sensors, such as radar 868, LiDAR 870, IR sensors, and ultrasonic sensors. The sensors may further include tire pressure sensors 854, 856, humidity sensors, temperature sensors, satellite geopositioning sensors 842, control input sensors 845, accelerometers 844, vibration sensors, gyroscopes, gravimeters, impact sensors 866, force meters, stress meters, strain sensors, fluid sensors, chemical sensors, gas content analyzers, pH sensors, radiation sensors, Geiger counters, neutron detectors, biological material sensors, microphones 862, 864, occupancy sensors 846, 848, 850, 852, proximity sensors, and other sensors.

The vehicle control unit 840 include one or more processors configured with processor-executable instructions to perform navigation and collision avoidance operations using information received from various sensors, particularly the cameras 858, 860. In some embodiments, the control unit 840 may supplement the processing of camera images using distance and relative position (e.g., relative bearing angle) that may be obtained from radar 868 and/or LiDAR 870 sensors. The control unit 840 may further be configured to control steering, breaking and speed of the vehicle when operating in an autonomous or semi-autonomous mode using information regarding other vehicles determined using various embodiments. The vehicle control unit 840 may include one or more processors configured with processor-executable instructions to receive information from the sensors 842-870 and to perform operations using such information as further described herein. In various embodiments, the vehicle control unit 840 may include, be a component of, or communicate with V2X onboard equipment of the vehicle.

FIG. 8C is a component block diagram illustrating the embedded vehicle computing system 800 including components and support systems suitable for implementing various embodiments. The embedded vehicle computing system 800 may include the control unit 840, which may include various circuits and devices used to control the operation of the vehicle. The control unit 840 may include a processor 840a, such as a CPU, an AI processor, etc., a memory 840b, an input module 840c, an output module 840d, and a radio module 840e. The control unit 840 may be coupled to and configured to control drive control components 872a, navigation components 872b, and one or more sensors 872c of the embedded vehicle computing system 800. The control unit 840 may communicate with V2X onboard equipment 840f. The processor 840a may be configured with processor-executable instructions to control maneuvering, navigation, and/or other operations of the vehicle, including operations of various embodiments, including gathering and analyzing real-world autonomous vehicle run data gathered from the sensors 872c and generating a probability of one or more insights of an insight decision tree(s). The processor 840a may be coupled to the memory 840b. The V2X onboard equipment 840f may include one or more processors 840g configured with processor-executable instructions to perform various operations of various embodiments, including communicating real-world autonomous vehicle run data gathered from the sensors 872c and a probability of one or more insights of an insight decision tree(s) generated by a wireless communication device 812 and/or a computing device on a communication network (e.g., a core network 832) between the embedded vehicle computing system 800 and the wireless communication device 812 and/or the computing device on the communication network via the radio module 840e.

The radio module 840e may be configured for wireless communication. The radio module 840e may exchange signals (e.g., command signals for controlling maneuvering, signals from navigation facilities, data signals including real-world autonomous vehicle run data and/or probabilities for insights of insight decision trees, etc.) via a communication link 822 with a network transceiver (e.g., the base station 810), and may provide the signals to the processor 840a, 840g and/or the navigation unit 872b. In some embodiments, the radio module 840e may enable the embedded vehicle computing system 800 to communicate with a wireless communication device 812 through the wireless communication link 824. The wireless communication link 824 may be a bidirectional or unidirectional communication link, and may use one or more communication protocols.

The input module 840c may receive sensor data from one or more vehicle sensors 872c as well as electronic signals from other components, including the drive control components 872a and the navigation components 872b. The output module 840d may communicate with or activate various components of the embedded vehicle computing system 800, including the drive control components 872a, the navigation components 872b, and the sensor(s) 872c.

The control unit 840 may be coupled to the drive control components 872a to control physical elements of the vehicle related to maneuvering and navigation of the vehicle, such as the engine, motors, throttles, steering elements, flight control elements, braking or deceleration elements, and the like. The drive control components 872a may also include components that control other devices of the vehicle, including interior environment controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 840 may be coupled to the navigation components 872b, and may receive data from the navigation components 872b and be configured to use such data to determine the present position and orientation of the vehicle, as well as an appropriate course toward a destination. The navigation components 872b may include or be coupled to a global navigation satellite system (GNSS) receiver system (e.g., one or more Global Positioning System (GPS) receivers) enabling the embedded vehicle computing system 800 to determine its current position using GNSS signals. Alternatively, or in addition, the navigation components 872b may include radio navigation receivers for receiving navigation beacons or other signals from radio nodes, such as Wi-Fi access points, cellular network sites, radio station, remote computing devices, other vehicles, etc. Through control of the drive control elements 872a, the processor 840a may control the vehicle to navigate and maneuver. The processor 840a, 840g and/or the navigation components 872b may be configured to communicate with a network element such as a server in a communication network (e.g., a core network 832) via the wireless communication link 822, 826 to receive commands to control maneuvering, receive data useful in navigation, provide real-time position reports, transmit real-world autonomous vehicle run data and/or receive probabilities for insights of insight decision trees, and assess other data.

The control unit 840 may be coupled to one or more sensors 872c. The sensor(s) 872c may include the sensors 842-870 as described, and may the configured to provide a variety of data to the processor 840a, 840g.

While the control unit 840 is described as including separate components, in some embodiments some or all of the components (e.g., the processor 840a, the memory 840b, the input module 840c, the output module 840d, and the radio module 840e) may be integrated in a single device or module, such as an SoC processing device. Such an SoC processing device may be configured for use in vehicles and be configured, such as with processor-executable instructions executing in the processor 840a, to perform operations of navigation and collision avoidance.

Figure 9:
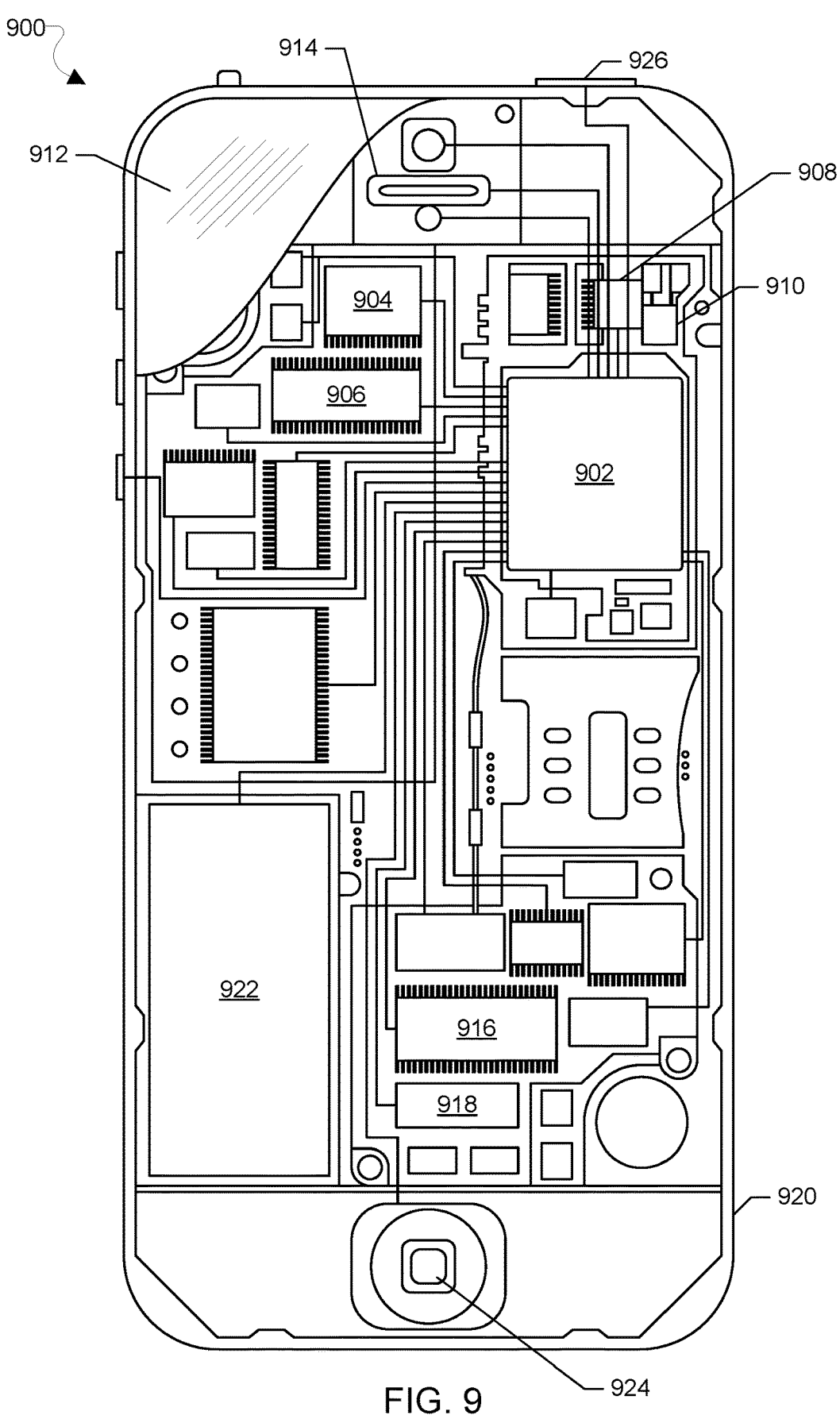
FIG. 9 is a component block diagram illustrating an example mobile computing device suitable for implementing various embodiments.

Methods and devices for implementing such methods in accordance with the various embodiments (including, but not limited to, embodiments described above with reference to FIGS. 1-7) may be implemented in a wide variety of computing systems including mobile computing devices, an example of which suitable for use with the various embodiments is illustrated in FIG. 9. The mobile computing device 900 may include a processor 902 coupled to a touchscreen controller 904 and an internal memory 906. The processor 902 may be one or more multicore integrated circuits designated for general or specific processing tasks. The internal memory 906 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 904 and the processor 902 may also be coupled to a touchscreen panel 912, such as a resistive-sensing touchscreen, capacitive-sensing touchscreen, infra-red sensing touchscreen, etc. Additionally, the display of the mobile computing device 900 need not have touch screen capability.

The mobile computing device 900 may have one or more radio signal transceivers 908 (e.g., Peanut, Bluetooth, Zig-Bee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The mobile computing device 900 may include a cellular network wireless modem chip 916 that enables communication via a cellular network and is coupled to the processor.

The mobile computing device 900 may include a peripheral device connection interface 918 coupled to the processor 902. The peripheral device connection interface 918 may be singularly configured to accept one type of connection, or may be configured to accept various types of physical and communication connections, common or proprietary, such as Universal Serial Bus (USB), FireWire, Thunderbolt, or PCIe. The peripheral device connection interface 918 may also be coupled to a similarly configured peripheral device connection port (not shown).

The mobile computing device 900 may also include speakers 914 for providing audio outputs. The mobile computing device 900 may also include a housing 920, constructed of a plastic, metal, or a combination of materials, for containing all or some of the components described herein. The mobile computing device 900 may include a power source 922 coupled to the processor 902, such as a disposable or rechargeable battery. The rechargeable battery may also be coupled to the peripheral device connection port to receive a charging current from a source external to the mobile computing device 900. The mobile computing device 900 may also include a physical button 924 for receiving user inputs. The mobile computing device 900 may also include a power button 926 for turning the mobile computing device 900 on and off.

Figure 10:
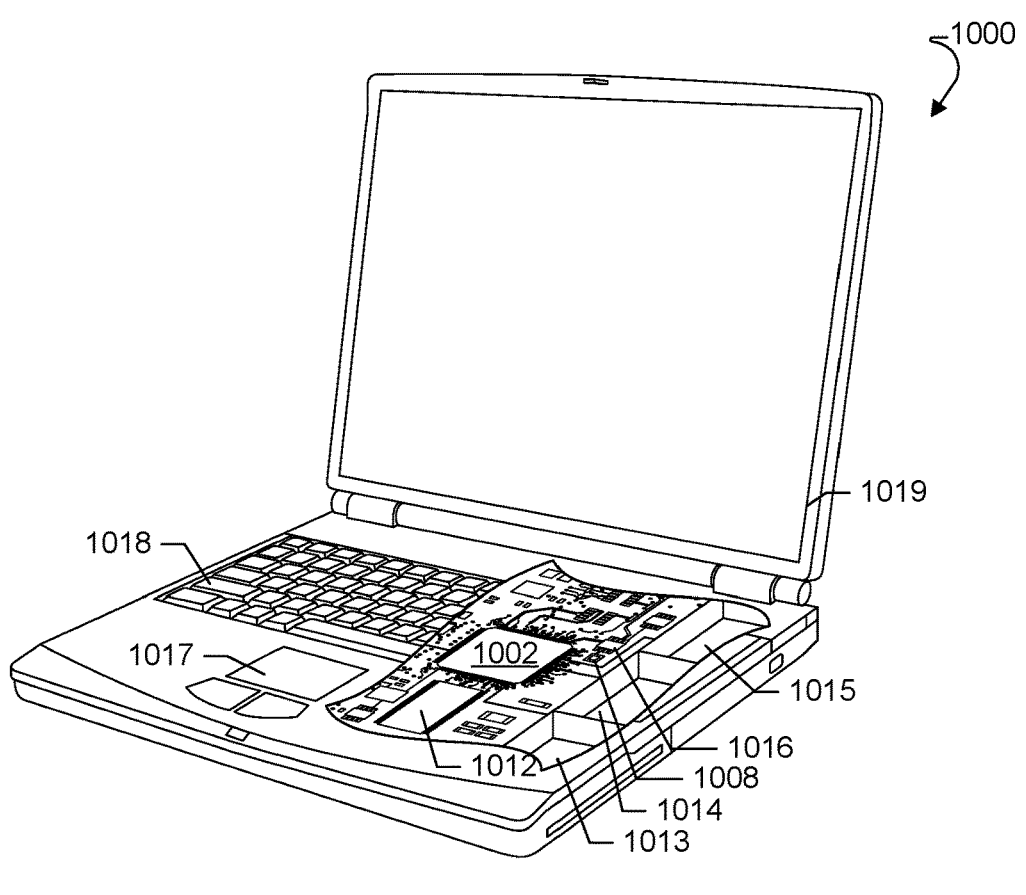
FIG. 10 is a component block diagram illustrating an example mobile computing device suitable for implementing various embodiments.

Methods and devices for implementing such methods in accordance with the various embodiments (including, but not limited to, embodiments described above with reference to FIGS. 1-7) may be implemented in a wide variety of computing systems include a laptop computer 1000 an example of which is illustrated in FIG. 10. A laptop computer 1000 will typically include a processor 1002 coupled to volatile memory 1012 and a large capacity nonvolatile memory, such as a compact disc (CD) drive 1013 or Flash memory. Additionally, the computer 1000 may have one or more antenna 1008 for sending and receiving electromagnetic radiation that may be connected to a wireless data link and/or cellular telephone transceiver 1016 coupled to the processor 1002. The computer 1000 may also include a floppy disc drive 1014 and a CD drive 1013 coupled to the processor 1002. In a notebook configuration, the computer housing may include a battery 1015, a touchpad touch surface 1017 that serves as the computer's pointing device, a keyboard 1018, and a display 1019 all coupled to the processor 1002. Other configurations of the computing device may include a computer mouse or trackball coupled to the processor (e.g., via a USB input) as are well known, which may also be used in conjunction with the various embodiments.

Figure 11:
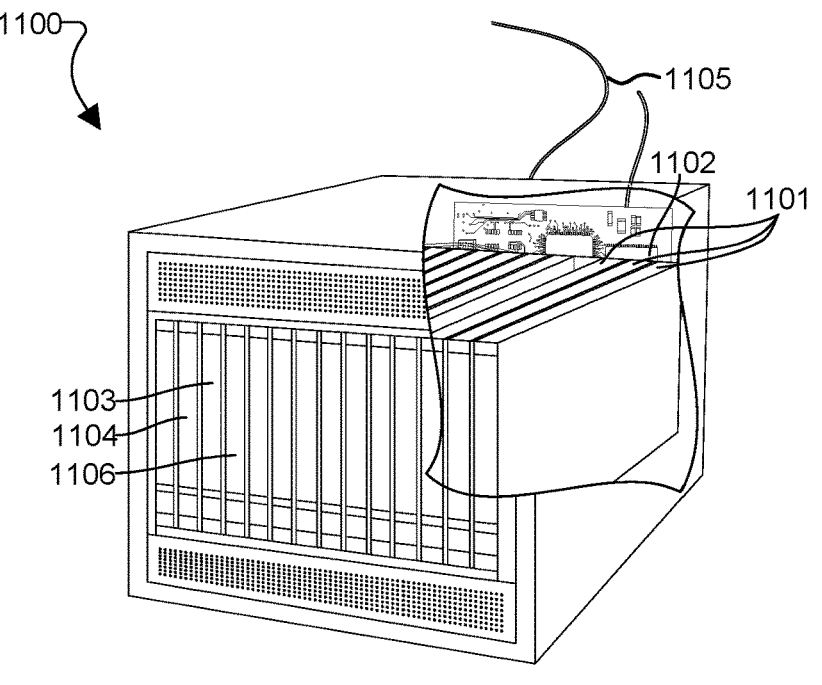
FIG. 11 is a component block diagram illustrating an example server suitable for implementing various embodiments.

Methods and devices for implementing such methods in accordance with the various embodiments (including, but not limited to, embodiments described above with reference to FIGS. 1-7) may also be implemented in fixed computing systems, such as any of a variety of commercially available servers. An example server 1100 is illustrated in FIG. 11. Such a server 1100 typically includes one or more multicore processor assemblies 1101 coupled to volatile memory 1102 and a large capacity nonvolatile memory, such as a disk drive 1104. As illustrated in FIG. 11, multicore processor assemblies 1101 may be added to the server 1100 by inserting them into the racks of the assembly. The server 1100 may also include a floppy disc drive, compact disc (CD) or digital versatile disc (DVD) disc drive 1106 coupled to the processor 1101. The server 1100 may also include network access ports 1103 coupled to the multicore processor assemblies 1101 for establishing network interface connections with a network 1105, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Implementation examples are described in the following paragraphs. While some of the following implementation examples are described in terms of example methods, further example implementations may include: the example methods discussed in the following paragraphs implemented by a computing device including a processing device configured with executable instructions to cause the processing device to perform operations of the example methods; the example methods discussed in the following paragraphs implemented by a computing device including means for performing functions of the example methods; and the example methods discussed in the following paragraphs implemented as a non-transitory processor-readable storage medium having stored thereon processor-executable instructions configured to cause a processor of a computing device to perform the operations of the example methods.

Example 1. A method for training a tree-based behavior prediction model, including: receiving real-world autonomous vehicle run data; labeling the real-world autonomous vehicle run data at various time slices to indicate to a processing device an insight of the real-world autonomous vehicle run data; selecting an insight decision tree of the tree-based behavior prediction model for training using the labeled real-world autonomous vehicle run data; training the insight decision tree using the labeled real-world autonomous vehicle run data to classify a probability of an insight associated with the insight decision tree; and updating the tree-based behavior prediction model based on training the insight decision tree using the labeled real-world autonomous vehicle run data.

Example 2. The method of example 1, in which labeling the real-world autonomous vehicle run data at the various time slices includes: labeling a first time slice of the various time slices with a ground truth insight; and labeling other time slices of the various time slices preceding the first time slice.

Example 3. The method of any of examples 1 or 2, further including: determining a feature of the real-world autonomous vehicle run data; and associating the real-world autonomous vehicle run data, the feature of the real-world autonomous vehicle run data, and a label of the real-world autonomous vehicle run data, in which selecting the insight decision tree of the tree-based behavior prediction model for training may include selecting the insight decision tree configured for classifying the probability of the insight of the label based on the feature.

Example 4. The method of any of examples 1-3, in which training the insight decision tree includes: determining whether a confidence score associated with a node of the insight decision tree exceeds a confidence threshold; and removing the node in response to determining that the confidence score associated with the node does not exceed the confidence threshold.

Example 5. The method of any of examples 1-4, further including determining whether a number of nodes of the insight decision tree exceeds an amount threshold, in which determining whether the confidence score associated with the node of the insight decision tree exceeds the confidence threshold occurs in response to determining that the number of nodes of the insight decision tree exceeds the amount threshold.

Example 6. A method for implementing a tree-based behavior prediction model, including: receiving real-world autonomous vehicle run data; selecting an insight decision tree of the tree-based behavior prediction model configured for classifying a probability of an insight associated with the insight decision tree using the real-world autonomous vehicle data; executing the insight decision tree using the real-world autonomous vehicle data; and outputting the probability of the insight associated with the insight decision tree based on executing the insight decision tree using the real-world autonomous vehicle data.

Example 7. The method of example 6, in which selecting the insight decision tree of the tree-based behavior prediction model configured for classifying the probability of the insight associated with the insight decision tree using the real-world autonomous vehicle data includes: determining a feature of the real-world autonomous vehicle data; and selecting the insight decision tree based on the insight decision tree being configured for classifying the probability of the insight associated with the insight decision tree using the feature.

Example 8. The method of any of examples 6 or 7, in which selecting the insight decision tree of the tree-based behavior prediction model configured for classifying the probability of the insight associated with the insight decision tree using the real-world autonomous vehicle data includes: determining whether a computational load of a processing device of an autonomous vehicle exceeds a computational load threshold; and selecting the insight decision tree based on the insight decision tree requiring fewer computations to traverse than a computation threshold in response to determining that the computational load of the processing device of the autonomous vehicle exceeds the computational load threshold.

Example 9. The method of any of examples 6-8, in which selecting the insight decision tree based on the insight decision tree requiring fewer computations to traverse than a computation threshold includes selecting the insight decision tree based on one of a depth of the insight decision tree not exceeding a depth indicated by the computation threshold or a number of feature threshold computations for nodes of an insight decision tree not exceeding a number of feature threshold computations indicated by the computation threshold.

Example 10. The method of any of examples 6-9, further including determining a feature of the real-world autonomous vehicle data, in which selecting the insight decision tree of the tree-based behavior prediction model configured for classifying the probability of the insight associated with the insight decision tree using the real-world autonomous vehicle data includes: determining whether a characteristic of the feature indicates to a processing device a variable nature of environmental conditions surrounding an autonomous vehicle; and selecting the insight decision tree based on an adaptability of the insight decision tree in response to the characteristic of the feature indicating to the processing device a variable nature of environmental conditions surrounding the autonomous vehicle.

Example 11. The method of any of examples 6-10, in which determining whether a characteristic of the feature indicates to the processing device a variable nature of environmental conditions surrounding the autonomous vehicle includes one of determining a confidence scores of the feature does not exceed a feature confidence threshold configured to indicate to a processing device a confidence in identification of the feature or determining multiple different classifications of a feature type for the feature.

Example 12. The method of any of examples 6-11, in which selecting the insight decision tree based on an adaptability of the insight decision tree includes selecting the insight decision tree based on the insight decision tree being configured for classifying the probability of the insight associated with the insight decision tree using multiple features.

Example 13. The method of any of examples 6-12, in which selecting the insight decision tree of the tree-based behavior prediction model configured for classifying the probability of the insight associated with the insight decision tree using the real-world autonomous vehicle data includes selecting the insight decision tree corresponding with a level of explainability set by a user.

Example 14. The method of any of examples 6-13, in which: selecting the insight decision tree of the tree-based behavior prediction model configured for classifying a probability of the insight associated with the insight decision tree using the real-world autonomous vehicle data includes determining a plurality insight decision trees, of which the insight decision tree is one, of the tree-based behavior prediction model configured for classifying probabilities of the insight associated with the plurality of insight decision trees using the real-world autonomous vehicle data; executing the insight decision tree using the real-world autonomous vehicle data includes executing the plurality of insight decision trees using the real-world autonomous vehicle data; and outputting the probability of the insight associated with the insight decision tree based on executing the insight decision tree using the real-world autonomous vehicle data includes outputting a plurality of probabilities of the insight associated with the plurality of insight decision trees based on executing the plurality of insight decision trees using the real-world autonomous vehicle data.

Example 15. The method of any of examples 6-14, further including outputting a confidence score associated with the probability of the insight associated with the insight decision tree based on executing the insight decision tree using the real-world autonomous vehicle data.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with various embodiments may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. The terms disk and disc include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for training a tree-based behavior prediction model, comprising:

receiving real-world autonomous vehicle run data;

labeling the real-world autonomous vehicle run data at a plurality of time slices to generate labeled data indicating to a processing device an insight of the real-world autonomous vehicle run data;

processing the real-world autonomous vehicle run data to determine features of the real-world autonomous vehicle run data at the plurality of time slices;

associating the features and the real-world autonomous vehicle run data at one or more time slices of the plurality of time slices;

selecting an insight decision tree of the tree-based behavior prediction model for training using the labeled data and the determined associations, wherein the selection is based on a correspondence between features of the insight decision tree and the determined features of the real-world autonomous vehicle run data and is associated with an insight such that each node of the insight decision tree represents a probability of the insight associated with the insight decision tree based on the real-world autonomous vehicle run data;

determining, based on a comparison of a number of nodes of the insight decision tree to a node amount threshold, the number of nodes of the insight decision tree exceeds the node amount threshold;

removing one or more nodes of the insight decision tree to reduce the number of nodes below the node amount threshold to generate a pruned insight decision tree;

training the pruned insight decision tree using the labeled real-world autonomous vehicle run data to classify a probability of the insight associated with the pruned insight decision tree;

assigning a confidence score to the trained insight decision tree based on a number of confirmed predictions of the trained insight decision tree; and updating the tree-based behavior prediction model based on training the pruned insight decision tree using the labeled real-world autonomous vehicle run data and the assignment of the confidence score.

2. The method of claim 1, wherein labeling the real-world autonomous vehicle run data at the plurality of time slices comprises:

labeling a first time slice of the plurality of time slices with a ground truth insight; and labeling other time slices of the plurality of time slices preceding the first time slice.

3. The method of claim 1, further comprising:

determining a feature of the real-world autonomous vehicle run data; and associating the real-world autonomous vehicle run data, the feature of the real-world autonomous vehicle run data, and a label of the real-world autonomous vehicle run data, wherein selecting the insight decision tree of the tree-based behavior prediction model for training comprises selecting the insight decision tree configured for classifying the probability of the insight of the label based on the feature.

4. A computing device, comprising a processing device configured with executable instructions to perform operations comprising:

receiving real-world autonomous vehicle run data;

labeling the real-world autonomous vehicle run data at a plurality of time slices to generate labeled data indicating to a processing device an insight of the real-world autonomous vehicle run data;

processing the real-world autonomous vehicle run data to determine features of the real-world autonomous vehicle run data at the plurality of time slices;

associating the features and the real-world autonomous vehicle run data at one or more time slices of the plurality of time slices;

selecting an insight decision tree of a tree-based behavior prediction model for training using the labeled data and the determined associations, wherein selection is based on a correspondence between features of the insight decision tree and the determined features of the real-world autonomous vehicle run data and is associated with an insight such that each node of the insight decision tree represents a probability of the insight associated with the insight decision tree based on the real-world autonomous vehicle run data;

determining, based on a comparison of a number of nodes of the insight decision tree to a node amount threshold, the number of nodes of the insight decision tree exceeds the node amount threshold;

removing one or more nodes of the insight decision tree to reduce the number of nodes below the node amount threshold to generate a pruned insight decision tree;

training the pruned insight decision tree using the labeled real-world autonomous vehicle run data to classify a probability of the insight associated with the pruned insight decision tree;

assigning a confidence score to the trained insight decision tree based on a number of confirmed predictions of the trained insight decision tree; and updating the tree-based behavior prediction model based on training the pruned insight decision tree using the labeled real-world autonomous vehicle run data and the assignment of the confidence score.

5. The computing device of claim 4, wherein the processing device is further configured with executable instructions to perform operations such that labeling the real-world autonomous vehicle run data at the plurality of time slices comprises:

labeling a first time slice of the plurality of time slices with a ground truth insight; and labeling other time slices of the plurality of time slices preceding the first time slice.

6. The computing device of claim 4, wherein the processing device is further configured with executable instructions to perform operations further comprising:

determining a feature of the real-world autonomous vehicle run data; and associating the real-world autonomous vehicle run data, the feature of the real-world autonomous vehicle run data, and a label of the real-world autonomous vehicle run data, wherein the processing device is configured with executable instructions to perform operations such that selecting the insight decision tree of the tree-based behavior prediction model for training comprises selecting the insight decision tree configured for classifying the probability of the insight of the label based on the feature.

* * * * *